United States Patent
Grossmann et al.

(10) Patent No.: US 10,788,306 B2
(45) Date of Patent: Sep. 29, 2020

(54) METHOD FOR POSITIONING A CENTER POINT ON A GEOMETRIC AXIS IN A MACHINE TOOL

(71) Applicant: Index-Werke GmbH & Co. KG Hahn & Tessky, Esslingen (DE)

(72) Inventors: Stefan Grossmann, Lichtenwald (DE); Stefan Stifter, Ebersbach (DE); Markus Reinert, Weilheim an der Teck (DE)

(73) Assignee: Index-Werke GmbH and Co. KG Hahn and Tessky, Esslingen (DE)

( * ) Notice: Subject to any disclaimer, the term of this patent is extended or adjusted under 35 U.S.C. 154(b) by 211 days.

(21) Appl. No.: 16/129,103

(22) Filed: Sep. 12, 2018

(65) Prior Publication Data
US 2019/0078868 A1    Mar. 14, 2019

(30) Foreign Application Priority Data
Sep. 12, 2017 (DE) .......... 10 2017 121 087

(51) Int. Cl.
*G01B 5/25* (2006.01)
*B23Q 17/22* (2006.01)
(Continued)

(52) U.S. Cl.
CPC ............. *G01B 5/25* (2013.01); *B23B 25/06* (2013.01); *B23Q 17/22* (2013.01); *G01B 5/252* (2013.01);
(Continued)

(58) Field of Classification Search
CPC ...................................... G01B 5/25
(Continued)

(56) References Cited

U.S. PATENT DOCUMENTS

| 4,218,825 A | 8/1980 | Asakura et al. |
| 7,712,228 B2 * | 5/2010 | Calas ........... B23Q 3/152 33/520 |

(Continued)

FOREIGN PATENT DOCUMENTS

| DE | 1605512 U | 4/1950 |
| DE | 2312786 A1 | 9/1974 |

(Continued)

*Primary Examiner* — George B Bennett
(74) *Attorney, Agent, or Firm* — Reinhart Boerner Van Deuren P.C.

(57) ABSTRACT

In order to improve a method for positioning a centre point of a second machine tool unit of a machine tool on a geometric axis of a first machine tool unit of the machine tool, wherein the second machine tool unit has a circular path concentric with the centre point, and wherein the first machine tool unit has a component that is rotatable about the geometric axis, in such a way that said method can be performed by an operator easily, reliably and within a short timeframe, it is proposed that a measuring unit is arranged in a defined manner relative to the geometric axis and the position of the circular path relative to the geometric axis is established using the measuring unit, that the position of the centre point of the circular path in the geometric plane relative to the geometric axis is calculated, and that adjustment paths in the geometric plane, which are associated with the adjustment directions, for positioning the centre point on the geometric axis are calculated, and that the machine tool units are moved relative to one another in accordance with these adjustment paths.

33 Claims, 16 Drawing Sheets

(51) Int. Cl.
   *B23B 25/06* (2006.01)
   *G01B 5/252* (2006.01)
   *G01B 3/22* (2006.01)
   *B23B 23/02* (2006.01)
   *G05B 19/401* (2006.01)

(52) U.S. Cl.
   CPC ............ *B23B 23/02* (2013.01); *G01B 3/22* (2013.01); *G05B 19/401* (2013.01); *G05B 2219/37405* (2013.01); *G05B 2219/45136* (2013.01)

(58) Field of Classification Search
   USPC .................................................. 33/613, 645
   See application file for complete search history.

(56) References Cited

U.S. PATENT DOCUMENTS

| | | | |
   |---|---|---|---|
   | 2006/0196065 A1* | 9/2006 | Bankestrom | G01B 21/30 33/550 |
   | 2008/0083127 A1* | 4/2008 | McMurtry | G01B 21/045 33/502 |
   | 2010/0138006 A1 | 6/2010 | Mies et al. | |
   | 2012/0131809 A1* | 5/2012 | Sahm | B23B 29/20 33/645 |
   | 2012/0255189 A1* | 10/2012 | Gaillard | F16B 23/003 33/542 |
   | 2014/0157610 A1* | 6/2014 | Garvey | G05B 19/401 33/503 |
   | 2015/0081083 A1* | 3/2015 | Kreschel | G05B 19/182 700/160 |
   | 2015/0292852 A1* | 10/2015 | Oki | G01B 5/008 33/502 |
   | 2015/0377617 A1* | 12/2015 | Ould | G01B 5/201 702/168 |
   | 2016/0195389 A1* | 7/2016 | Sagemueller | G05B 19/401 33/503 |

FOREIGN PATENT DOCUMENTS

| | | |
   |---|---|---|
   | DE | 7718280 U1 | 11/1977 |
   | DE | 2727062 A1 | 12/1977 |
   | DE | 2852157 A1 | 6/1979 |
   | EP | 1 182 003 A2 | 2/2002 |
   | EP | 2192463 A1 | 6/2010 |
   | KR | 2014 0001449 A | 1/2014 |

* cited by examiner

METHOD FOR POSITIONING A CENTER POINT ON A GEOMETRIC AXIS IN A MACHINE TOOL

CROSS-REFERENCE TO RELATED PATENT APPLICATION

This patent application claims the benefit of German application No. 10 2017 121 087.3, filed Sep. 12, 2017, the teachings and disclosure of which are hereby incorporated in their entirety by reference thereto.

BACKGROUND OF THE INVENTION

The invention relates to a method for positioning a centre point of a second machine tool unit of a machine tool on a geometric axis of a first machine tool unit of the machine tool, wherein the second machine tool unit has a circular path that is concentric with the centre point, is scannable, and lies on a circular cylindrical surface, and wherein the first machine tool unit comprises a component that is rotatable about an axis of rotation coincident with the geometric axis.

A method of this kind is usually performed iteratively and manually, wherein the duration of this method is dependent on the skill of an operator of the machine tool performing this method.

SUMMARY OF THE INVENTION

The object of the invention is therefore to improve a method of kind described at the outset in such a way that said method can be performed by an operator easily, reliably and within a short timeframe.

In the case of a method of the kind described at the outset, this object is achieved in accordance with the invention in that a measuring unit is arranged on the first machine tool unit in a defined manner relative to the geometric axis and the position of the circular path in a geometric plane, defined by the circular path, relative to the geometric axis is established using the measuring unit in that the position of the circular path is ascertained by means of the measuring unit by establishing the positions of three measurement points arranged at defined angular spacings from one another over the circular path relative to the geometric axis, in that the position of the centre point of the circular path in the geometric plane relative to the geometric axis and a reference direction running through the geometric axis is calculated on the basis of the positions of the measurement points and the known radius of the circular path, and in that, using machine tool-based adjustment directions of the machine tool units relative to one another, adjustment paths in the geometric plane, which are associated with the adjustment directions, for positioning the centre point on the geometric axis are calculated, and in that the machine tool units are moved relative to one another in accordance with the adjustment paths.

The advantage of the invention can be considered to be the fact that, by means of the calculation of the centre point relative to the geometric axis and relative to the reference direction, the adjustment paths necessary in the adjustment directions for displacement of the centre point onto the geometric axis can also be calculated, and by moving the machine tool units relative to one another the centre point of the circular path can thus be moved in a simple manner, such that it lies ultimately on the geometric axis.

With regard to the determining of the positions of the three measurement points, no further details were provided in conjunction with the previous explanation of the solution according to the invention.

In principle, the positions of the measurement points could be established in a wide range of different ways using the measuring unit.

For example, it is conceivable to use three measuring units and to move these in the direction of the geometric axis so as to establish the positions of the three measurement points simultaneously.

An advantageous solution thus provides that the positions of the three measurement points are defined by pivoting the measuring unit about the geometric axis in a measurement direction corresponding to the particular measurement point and running radially relative to the geometric axis, and that the position of the particular measurement point in the corresponding measurement direction is defined by means of the measuring unit.

Here, the position of the particular measurement point could be ascertained by measuring the spacing of the measurement point from the geometric axis in the corresponding measurement direction.

An advantageous solution that is particularly easy to implement provides that the position of the particular measurement point is ascertained by measuring the spacing thereof from a reference circular path, which runs around the geometric axis, in the radial direction relative to the geometric axis.

Here, the reference circular path is preferably selected such that the radius thereof is greater than the radius of the circular path of which the position is to be ascertained.

The advantage of determining the positions of the measurement points by determining the spacing thereof from a reference circular path can be considered to be the fact that the reference circular path does not have to be fixed in respect of its absolute value, but must remain constant when determining the measurement points and merely defines a reference value for the measurement unit, and therefore the measurement unit establishes the spacing of the measurement points from the reference circular path about the geometric axis in each case proceeding from the reference value of said measuring unit.

With regard to the position of the measurement points, no further details were provided in conjunction with the determination of the positions.

An advantageous solution thus provides that the three measurement points are selected such that they lie within an angular range of 180° about the geometric axis.

The centre point of the circular path can be calculated particularly advantageously if the three measurement points are selected such that an angular range of 90° is provided between a first measurement point and a second measurement point and between the second measurement point and a third measurement point.

With regard to the determination of the machine tool-based adjustment directions relative to the positions of the measurement points or the measurement directions of the measurement points, no further details have yet been provided.

An advantageous solution provides that the machine tool-based adjustment directions are determined by arranging the position of one of the three measurement points in a geometric measurement direction running radially relative to the geometric axis and parallel to one of the adjustment directions.

An arrangement of this kind of the geometric measurement direction can be achieved for example in that an edge of the second machine tool unit defined in one of the adjustment directions has a projection in the direction of the measuring unit and therefore the measurement direction can be oriented parallel to this edge with the aid of the projection of the edge or a shadow of this edge on the measuring unit.

It is particularly simple if a first of the three measurement points is arranged in the measurement direction running through the geometric axis and parallel to one of the adjustment directions.

Another solution for determining the machine tool-based adjustment directions relative to the positions of the measurement points provides that the machine tool-based adjustment directions are determined by a first establishment of the position of the centre point of the second machine tool unit in a first determination position, a subsequent relative movement of the two machine tool units along a selected one of the adjustment directions into a second determination position, and in said second determination position a second establishment of the position of the centre point of the second machine tool unit, and that the position and the course of the selected adjustment direction is ascertained by establishing the orientation of a connecting line between the centre points in the first and second determination position, wherein in particular the course of the selected adjustment direction relative to the geometric axis is established.

In this solution it is particularly advantageous if the measurement directions in which the positions of the measurement points are established are identical in the first determination position and in the second determination position.

In order to assist the operator in moving the machine tool units relative to one another for positioning the centre point on the geometric axis in accordance with the adjustment paths, it is preferably provided that, as the machine tool units move in at least one of the adjustment directions, the at least one continuous adjustment path is determined by means of the measuring unit.

It is even better if, as the machine tool units move in the adjustment directions, the adjustment paths travelled over are determined by means of the measuring unit, such that it can be ensured in a simple manner that the calculated adjustment path is also actually travelled over.

It is preferably provided here that, in order to determine the movement of the machine tool units relative to one another in the adjustment directions, the measuring unit is positioned by pivoting about the geometric axis in measurement directions running parallel to the respective adjustment directions, such that the adjustment paths to be travelled over can thus be monitored in a simple manner using the measuring unit.

The method according to the invention can be carried out in particular if a cylinder axis of the circular cylindrical surface runs parallel to the geometric axis.

It is also preferably provided that the adjustment directions on the one hand run perpendicularly to one another and on the other hand run perpendicularly to the geometric axis.

The previously described method steps can all be carried out manually in principle.

In order to calculate the centre point of the circular path, it has proven to be particularly advantageous if positions of the measurement points established by the measuring unit are transmitted to a computer unit, which establishes the centre point of the circular path relative to the geometric axis and a reference direction running through the geometric axis, in particular since a numerical establishment of the centre point lends itself in view of the complex mathematics.

It is also preferably provided that the computer unit, using information regarding the tool machine-based adjustment directions, establishes adjustment paths in the adjustment directions for positioning the centre point on the geometric axis.

This establishment of the adjustment paths, which is preferably performed on the basis of the geometric calculations, can also be carried out particularly favourably by means of a computer unit.

In the method according to the invention, functions of the machine tool which are provided therein can be utilised even more advantageously.

It is thus preferably provided that the measuring unit is connected to the component rotatable about the axis of rotation, and that by means of a centring controller the measuring unit is pivoted about the geometric axis by means of the first machine tool unit by control thereof in order to determine the three measurement points.

This means that the function of the machine tool provided anyway can be utilised by the first machine tool unit by means of a centring controller in order to perform the pivoting of the measuring unit about the geometric axis.

It is also preferably provided that for each measurement point the position of the measurement point is established by means of the measuring unit by actuation and reading thereof by means of the centring controller and in particular is stored in the computer unit.

Furthermore, the method according to the invention can be carried out advantageously if, for determining at least one of the adjustment paths of the measuring device, as the machine tool units move relative to one another in the at least one adjustment direction the measuring unit is pivoted in a measurement direction parallel to the adjustment direction by means of the centring controller by control of the first machine tool unit.

A further advantageous embodiment of the method according to the invention provides that, by means of the centring controller, the machine tool units are moved relative to one another, by control of at least one movement unit of the machine tool units, in one of the adjustment directions from a first determination position into a second determination position, and that the position of the circular path is ascertained in the second determination position in the same way as in the first determination position, and the position of the centre point of the circular path is calculated.

No further details have yet been provided in respect of the ascertainment of the adjustment direction.

A preferred solution provides that the adjustment direction is calculated by means of the computer unit establishing the orientation of a connecting line traversing the centre point in the first determination position and the centre point in the second determination position.

In order to be able to position the centre point on the geometric axis in a simple way, it is preferably provided that the machine tool units, proceeding from the first or second determination position, are moved over an adjustment path in the calculated adjustment direction to such an extent that once the adjustment path has been travelled over in the further adjustment direction the centre point lies on the geometric axis.

In particular, the adjustment path in the further adjustment direction and the computer unit is established here on the proviso that the further adjustment direction runs perpendicularly to the adjustment direction first calculated.

So as to be able to determine in this case the movement in the further adjustment direction, it is preferably provided that a measurement direction of the measuring unit is oriented parallel to the second adjustment direction by control of the rotation of the component of the first machine tool unit by the centring controller, and the adjustment path to be travelled over in this adjustment direction is measured, and in particular is displayed to an operator.

The invention additionally relates to a machine tool comprising a first machine tool unit with a component that is rotatable about an axis of rotation coincident with a geometric axis, and comprising a second machine tool unit with a circular path concentric with a centre point and arranged on a circular cylindrical surface.

In a machine tool of this kind, so as to be able to orient the two machine tool units relative to one another in a simple way such that the centre point lies on the geometric axis, it is preferably provided that the machine tool is associated with a measuring unit which determines positions of measurement points arranged on the circular path relative to the geometric axis.

In particular, the measurement values determined by the measuring unit can be further processed in a favourable manner if the machine tool is associated with a computer unit and if the computer unit determines and stores measurement values of the measuring unit.

Here, it is preferably provided that the measurement values are transmitted to the measuring unit within the scope of a data transfer, whether wired or wireless.

It is also preferably provided that the computer unit establishes the position of the centre point relative to the geometric axis and a reference direction on the basis of the positions of measurement points arranged at defined angular spacings on the circular path and on the basis of the known radius of the circular path, such that in particular, since the centre point generally must be established numerically, there is a simple possibility for easily establishing the particular position of the centre point of the circular path.

It is additionally also provided that the computer unit establishes adjustment paths for positioning the centre point on the geometric axis using information regarding the machine tool-based adjustment directions.

This means that the computer unit, on the basis of geometric considerations, is usually able to establish the adjustment paths that are necessary in the respective adjustment directions in order to move the machine tool units relative to one another such that the centre point lies on the geometric axis.

The computer unit could in principle be a computer unit provided specifically for the positioning of the centre point on the geometric axis.

It has proven to be particularly advantageous, however, if the machine tool comprises a machine controller which is associated with the computer unit.

A particularly advantageous machine tool is one in which the measuring unit is connected to the component rotatable about the axis of rotation and in which by means of the centring controller the measuring unit for determining the three measurement points unit is pivoted about the geometric axis by means of the first machine tool by control thereof, wherein this is usually performed in the form of a position-controlled pivoting, such that the measuring unit can be oriented exactly in the respective angular positions for determining the three measurement points.

In this case it is preferably provided that in each measurement point the position of the measurement point is established by means of the measuring unit by actuation and reading by means of the centring controller and is stored in the computer unit.

In a machine tool according to the invention it is also preferably provided that the centring controller, for determining at least one of the adjustment paths as the machine tool units move relative to one another in the at least one adjustment direction, pivots the measuring unit in a measurement direction parallel to the adjustment direction by control of the first machine tool.

It is thus possible, with an orientation of the adjustment direction known to the centring controller, to orient the measuring unit such that, by means of said measuring unit, the adjustment path to be travelled over can be checked and therefore it can be checked whether the established adjustment path is also actually travelled over in this adjustment direction.

A further advantageous embodiment of the machine tool provides that the centring controller, once the position of the centre point of the circular path has been established by the computer unit in a first determination position, moves the machine tool units relative to one another by control of a movement unit of the machine tools in one of the adjustment directions from the first determination position into the second determination position, and that the computer unit in the second determination position ascertains the position of the circular path and calculates the position of the centre point of the circular path in the same way as in the first determination position.

This type of establishment of the centre points of the circular path in two different determination positions makes it possible for the computer unit to likewise determine the orientation of the adjustment direction.

In this regard it is preferably provided that the computer unit calculates the adjustment direction by establishing the orientation of a connecting line traversing the first centre point in the first determination position and traversing the centre point in the second determination position, wherein the position and orientation of the connecting line then indicate the position and orientation of the adjustment direction to be established.

In this case the centring controller can be used such that it moves the machine tool units, proceeding from the first or second determination position, in the specific adjustment direction over an adjustment path to such an extent that once the adjustment path has been travelled over in the further adjustment direction the centre point lies on the geometric axis.

In particular, it is provided in one of the above-described embodiments of the machine tool according to the invention that said machine tool operates in accordance with an embodiment of the method described in the introduction.

Further features and advantages are the subject of the following description and the presentation of some exemplary embodiments in the form of a drawing.

DETAILED DESCRIPTION OF THE INVENTION

Figure 1:
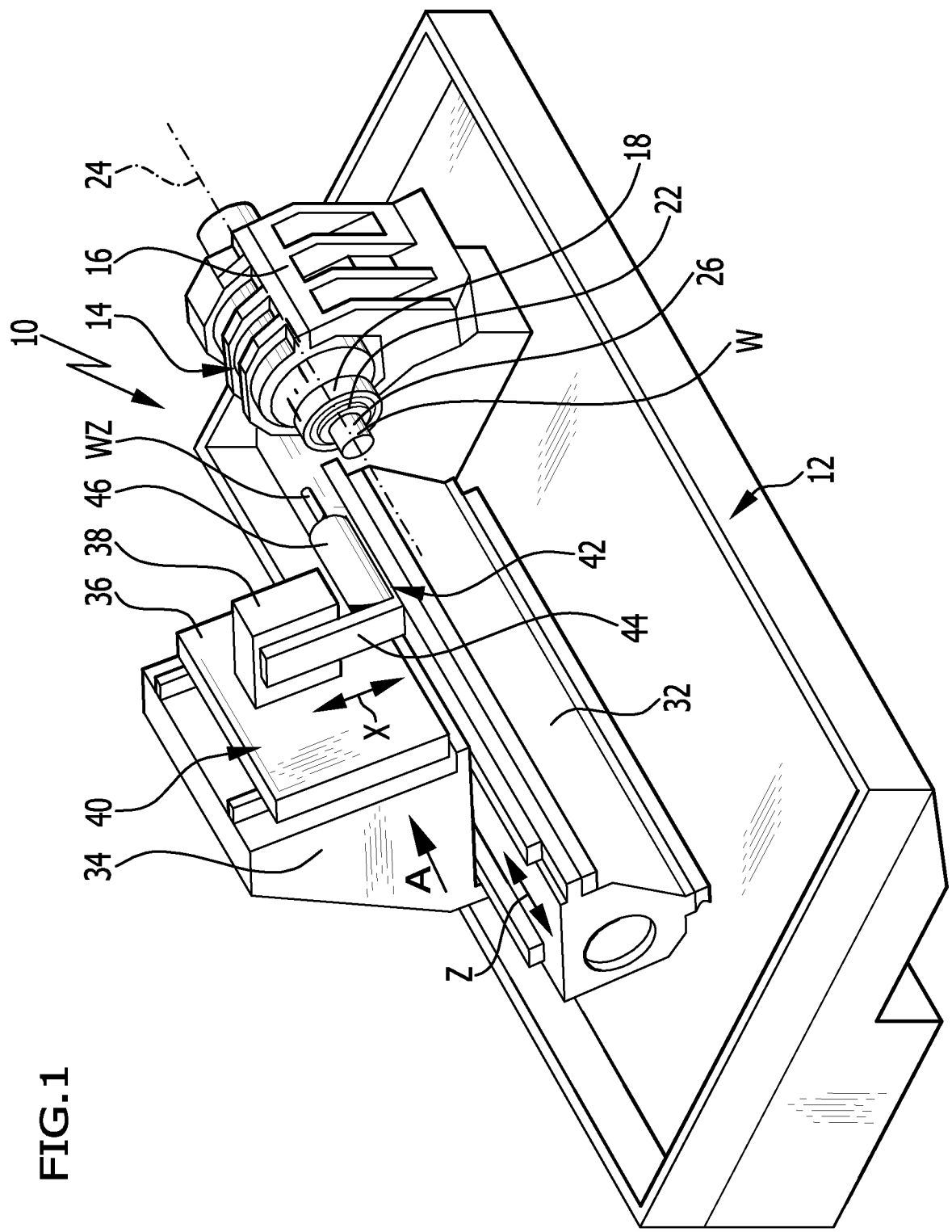
FIG. 1 shows a schematic perspective illustration of a first exemplary embodiment of a machine tool.

An exemplary embodiment of a machine tool 10 according to the invention shown in FIG. 1 comprises a machine frame denoted on the whole by 12, on which a workpiece spindle unit 14 is arranged, wherein the workpiece spindle unit 14 for example comprises a motor spindle 18 arranged in a spindle housing 16, by means of which motor spindle a spindle tube 22 is rotatable about a spindle axis 24, wherein the spindle tube 22 comprises a workpiece mount 26, for example a chuck, for fixing a workpiece W, which is thus likewise rotatable about the spindle axis 24.

In order to machine the workpiece W, a machine bed 32 is arranged on the machine frame 12, on which machine bed there is a first slide body 34 mounted movably in a Z direction parallel to the spindle axis 24, wherein a second slide body 36 is guided on the first slide body 34 in an X direction running perpendicularly to the Z direction and thus also running perpendicularly to the spindle axis 24. The slide bodies 34 and 36 together form a compound slide 40.

A tool carrier 38 is arranged on the second slide body 36, on which tool carrier there is arranged, for example, a tool holder denoted as a whole by 42, which comprises a tool holder base 44 mounted on the tool carrier 38 and for example comprises a sleeve 46, in which there is arranged a tool WZ, for example a drill.

Figure 2:
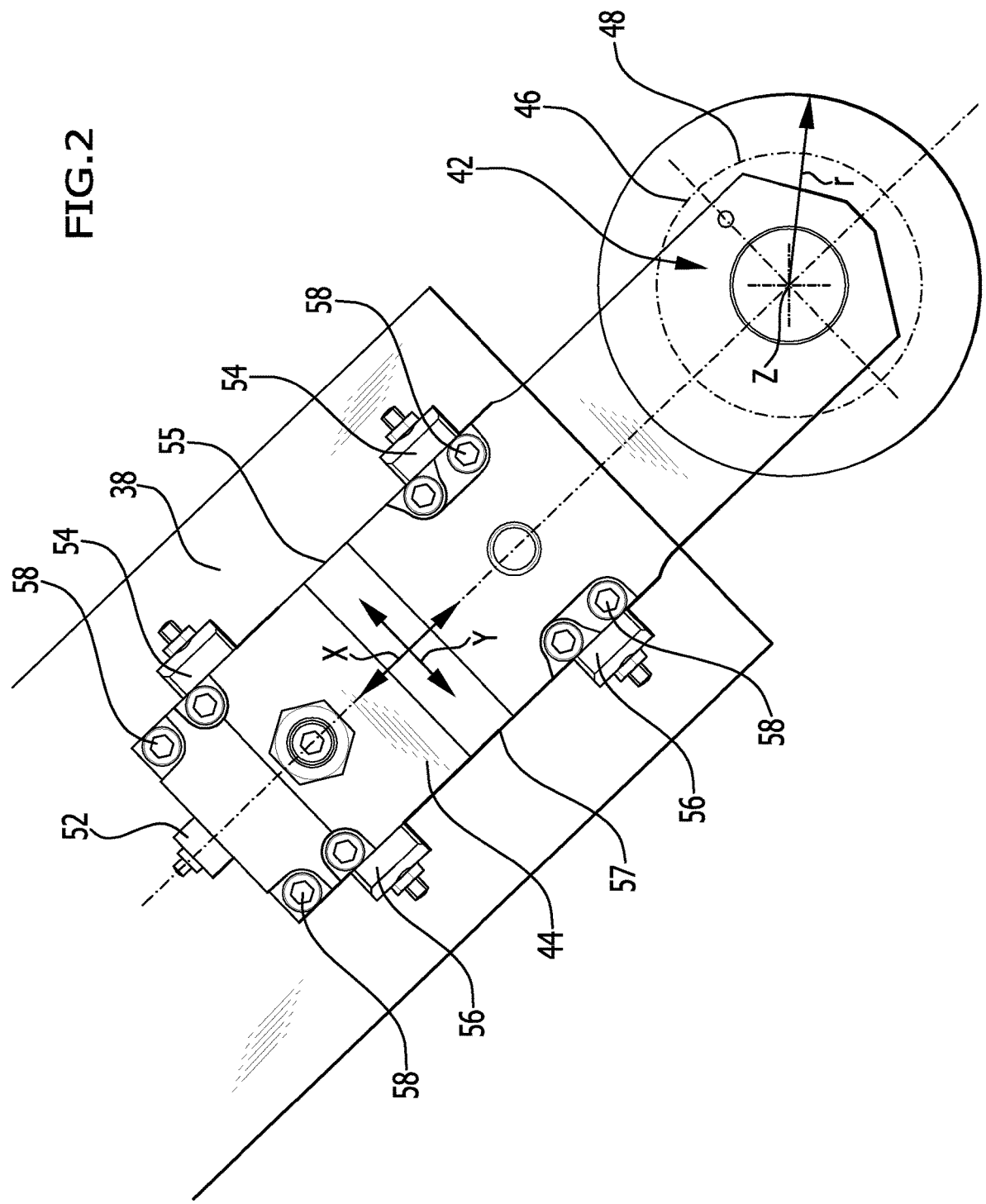
FIG. 2 shows a plan view, in the direction of the arrow A, of a tool carrier and a tool holder base of a tool holder held on said tool carrier.

As shown in FIG. 2, the tool holder base 44 of the tool holder 42 is adjustable relative to the tool carrier 38 by an adjustment unit 52 in an adjustment direction parallel to the X axis and is displaceable transversely to the X axis, that is to say in the direction of the Y axis, by means of adjustment units 54 and 56 arranged on either side of the tool holder base 44, which adjustment units guide the tool holder base 44 in the X direction in the region of their longitudinal sides 55 and 57 during the adjustment of said tool holder base in the X direction by means of the adjustment unit 52, wherein the tool holder base 44 can be fixed by screws 58 to the tool carrier 38 in a particular position, such that, once the screws 58 have been loosened by means of the adjustment units 52 and 54 and 56, a displacement of the tool holder base 44 relative to the tool carrier 38 in the particular adjustment direction is possible.

In the case of tool holders 42 of this kind, the tool WZ is for example mounted concentrically with the sleeve 46, and the sleeve 46 comprises a circular cylindrical surface 48, in particular a circular cylindrical circumferential surface, the radius r of which starting from its cylinder axis Z is known.

When a tool holder 42 of this kind is mounted on the tool carrier 38, there is the problem for exact centric machining of the workpiece W of arranging the sleeve 46, with the tool WZ mounted for example concentrically therein, such that the cylinder axis Z of the sleeve 46 in a defined position of the tool carrier 38 is coincident with the spindle axis 24.

Figure 3:
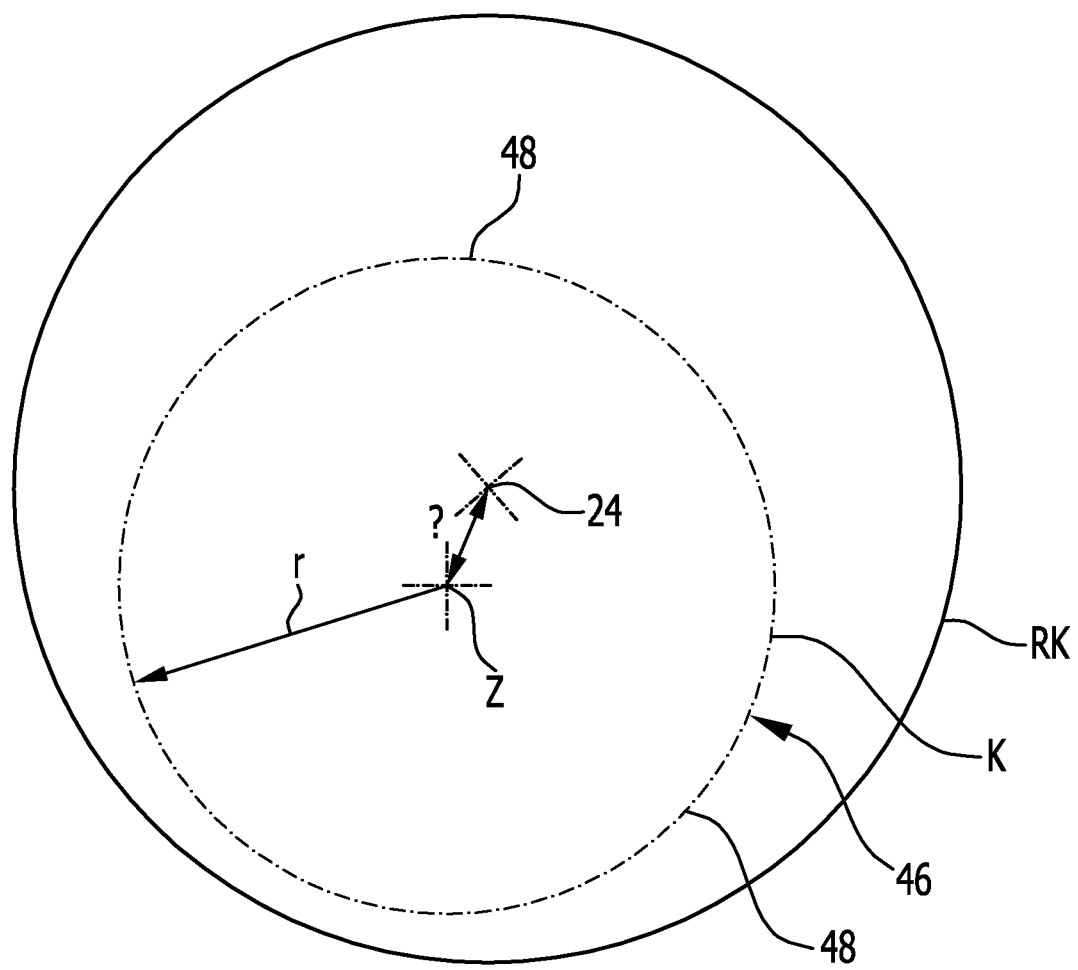
FIG. 3 shows a schematic illustration of a circular path K defined by a cylindrical surface of a sleeve of the tool holder in the unascertained position of said circular path relative to the geometric axis and a reference circular path running around the geometric axis.

As shown in FIG. 3, with mounting of the tool holder 42, the situation illustrated for example in FIG. 3 is usually present, i.e. that the cylinder axis Z of the circular cylindrical surface 48 of the sleeve 46 is arranged at an undefined spacing from the spindle axis 24, spaced therefrom in an undefined direction, but in particular is arranged parallel thereto.

For this reason there is the need to displace the sleeve 46 such that the cylinder axis Z, which defines a centre point of the circular cylindrical surface 48, coincides with the spindle axis 24.

Figure 4:
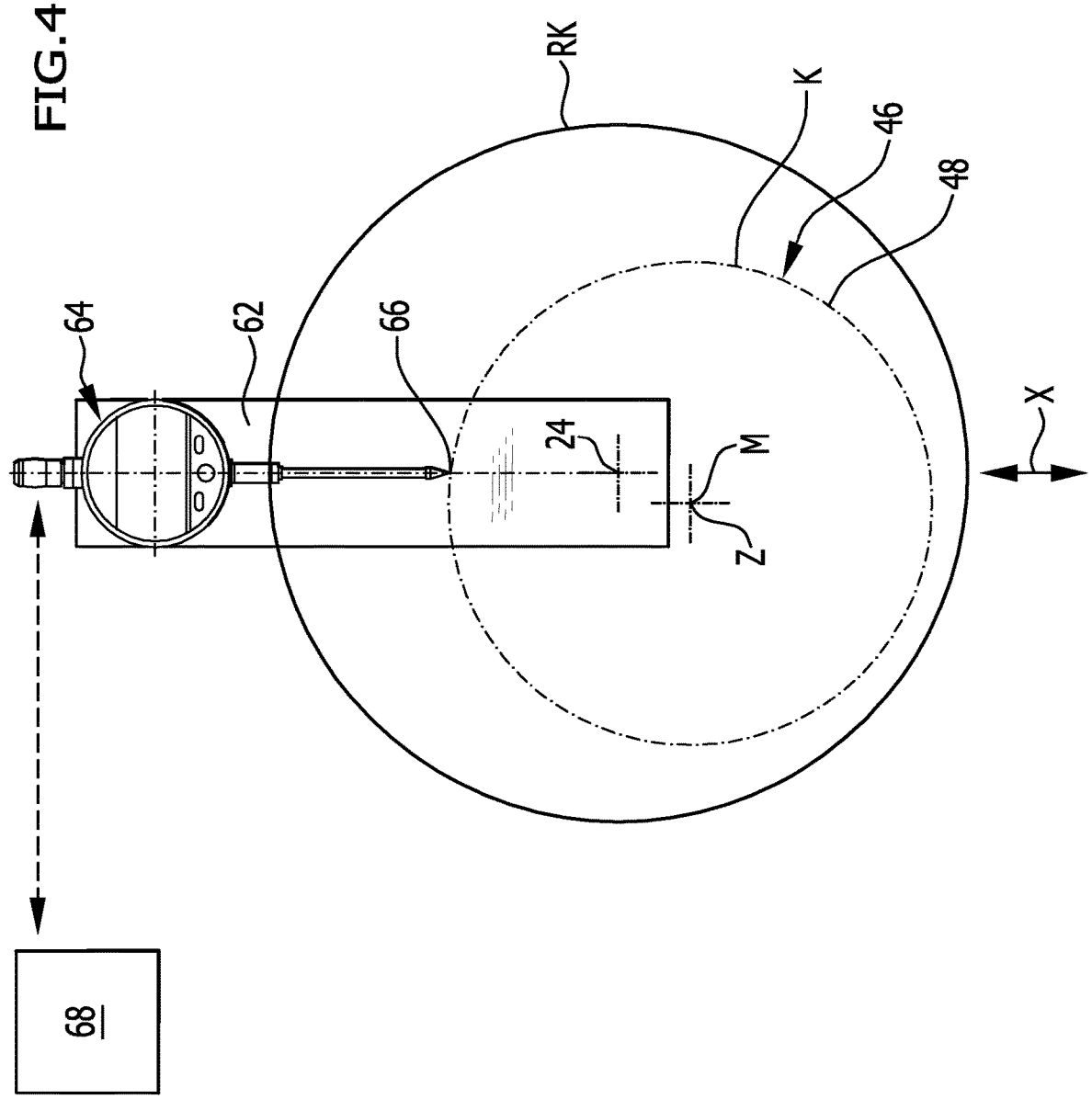
FIG. 4 shows an illustration similar to FIG. 3 with additional illustration of a measuring unit which is arranged pivotably about the geometric axis by means of a holder, and the orientation of the measuring unit 64 parallel to the X axis.

In this regard, in a first exemplary embodiment of the method according to the invention, a holder 62 is mounted in the workpiece receptacle 26 of the spindle tube 22, as shown in FIG. 4, which holder is rotatable about the spindle axis 24 by means of the spindle tube 22 rotatable about the spindle axis 26 and carries a measuring unit 64 which has a probe tip 66 with which positions can be determined in a radial direction relative to the spindle axis 24, which at the same time constitutes a geometric axis for the orientation of the sleeve 46.

Here, the probe tip 66, for example proceeding from a reference circular path RK about the spindle axis 24 with a reference radius R, measures the position of a circular path K arranged on the circular cylindrical surface 48 and defined by an intersection of this circular cylindrical surface 48 with a plane KE running perpendicularly to the geometric axis 24, by ascertaining a radial spacing from the reference circular path RK in relation to the spindle axis 24.

In order to ascertain the position of the sleeve 46 relative to the spindle axis 24, the circular cylindrical surface 48 is scanned by moving the probe tip 66 along the circular path K, so as to determine the position thereof relative to the spindle axis 24 and so as to establish, on the basis of the position of the circular path K on the circular cylindrical surface 48, the position of a centre point M of the circular path K determined on the cylindrical surface 48 by the probe tip 66 of the measuring unit 64, said centre point being arranged on the cylinder axis Z of said circular cylindrical surface in the plane KE.

In order to simplify the ascertainment of the circular path K travelled over by means of the probe tip 66 at the position of the circular cylindrical surface 48, a manual rotation for example of the orientation of the measuring unit 64 about the spindle axis 24 is performed, as shown in FIG. 4, until the probe tip 66 is movable in a first measurement plane E1 for measuring the spacing of the circular path K from the reference circular path RK in a radial direction relative to the geometric axis 24, which for example is oriented parallel to the X axis and runs through the geometric axis 24.

In the case of manual ascertainment, the orientation parallel to the X axis is established in that for example one of the side edges 55 or 57 of the tool holder base 44 acted on by the adjustment units 54, 56 is used as a reference direction and is projected in the direction of the probe tip 66 by shadow projection for orientation of the measuring unit 64.

In the measurement plane E1 thus oriented parallel to the X axis, the spacing m1 from the reference circular path RK is then ascertained in a measurement direction MR1 running through the measurement point P1 and radially relative to the geometric axis 24 by means of the probe tip 66 scanning the circular cylindrical surface 48 at the measurement point P1.

The measuring device 64 is then pivoted manually for example about the spindle axis 24 through 90°, such that the probe tip 66 lies in a second measurement plane E2, which runs through the geometric axis 24, and for measuring is movable in a measurement direction MR2 running through the measurement point P2 and radially relative to the geometric axis 24, and in this case the spacing m2 of the measurement point P2 from the reference circular path RK is ascertained at the measurement point P2 using the probe tip 66.

Figure 5:
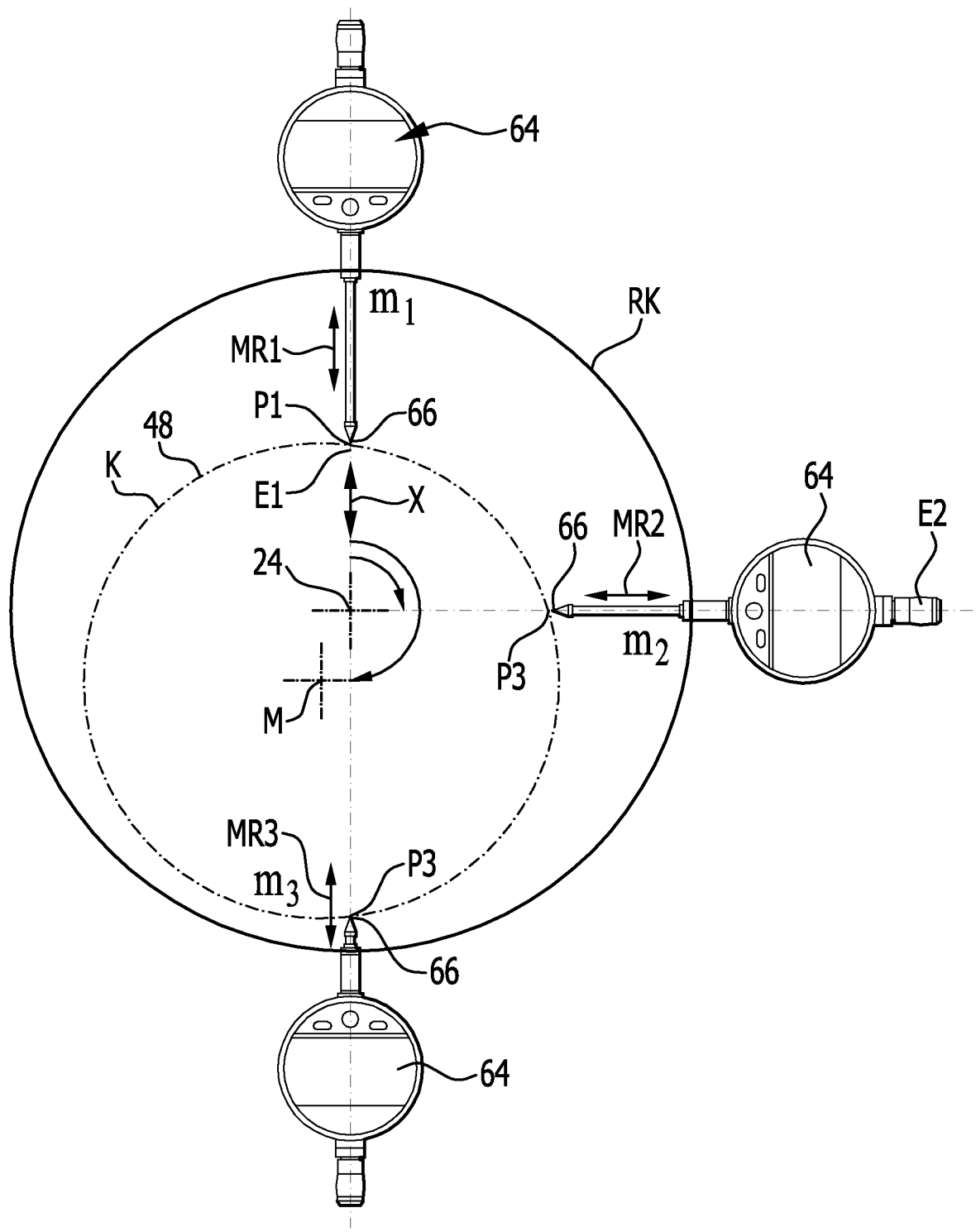
FIG. 5 shows an ascertainment of the positions of three measurement points on the circular path by pivoting of the measuring unit in three measurement planes and measuring of the positions in the respective measurement planes.

Lastly, there follows for example a manual pivoting of the measuring device 64 through 180° relative to the reference point P1 and relative to the measurement plane E1, such that the probe tip 66 lies in a third measurement plane E3, which runs through the geometric axis 24, and for measuring is movable in this plane in a measurement direction MR3 running through the measurement point P3 and radially relative to the geometric axis 24, such that the spacing m3 from the reference circular path RK is determined by means of the probe tip 66 at the measurement point P3, which is exactly opposite the measurement point P1 with respect to the spindle axis 24 (FIG. 5).

The spacings m1, m2, m3 determined by the measuring unit 64 are transmitted for example to a computer unit 68 associated with the machine tool 10 and are stored thereby, correlated with the measurement directions MR1, MR2 and MR3.

Figure 6:
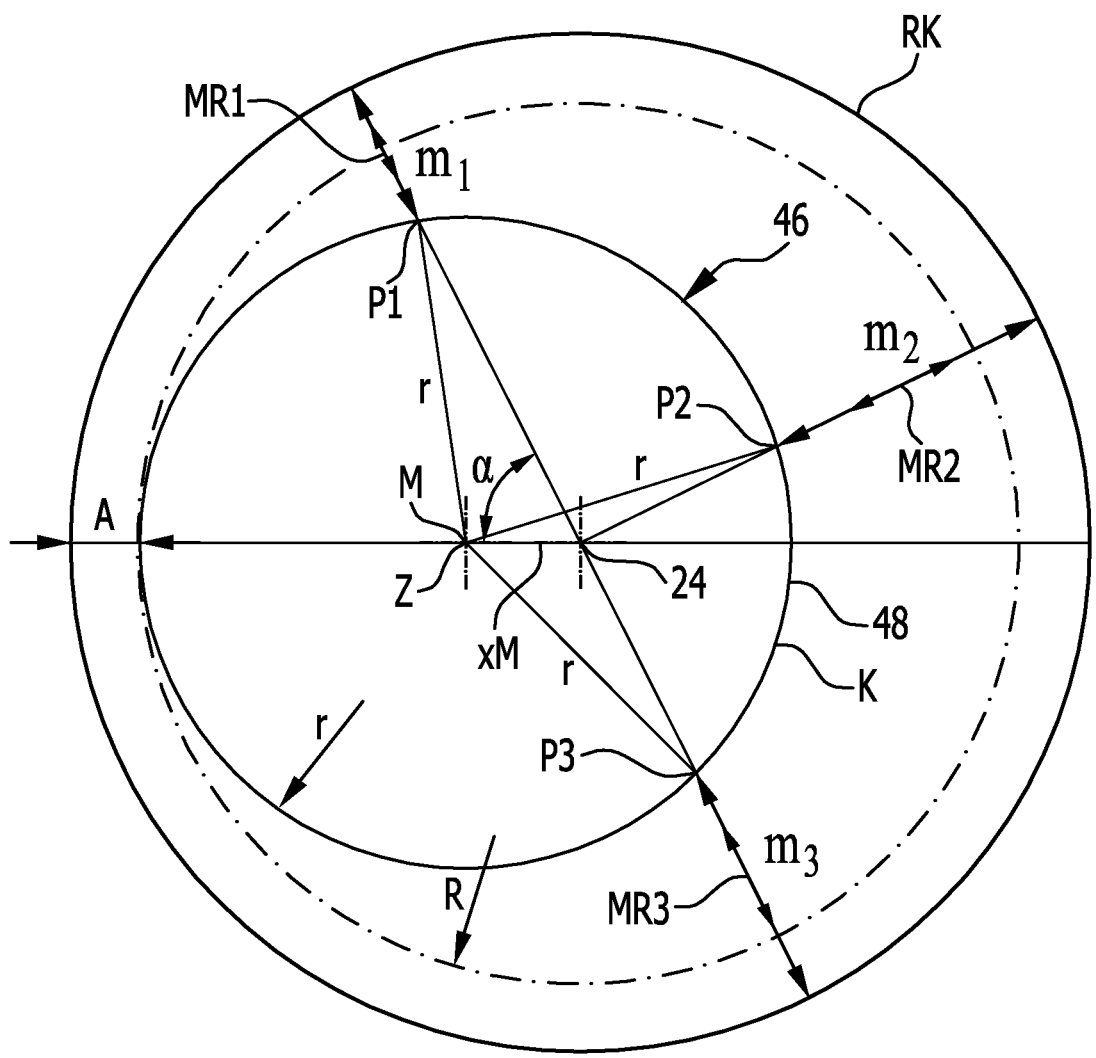
FIG. 6 shows an illustration of the circular path, the reference circular path, and the measured positions of the measurement points with schematic illustration of the parameters resulting from the calculation for establishing the centre point of the circular path, as are given from the formulas cited in the description, wherein the position of the centre point does not match that in FIG. 5 or FIG. 7.

Using the spacings m1, m2 and m3 of the measurement points P1, P2 and P3 from the reference circular path RK, measured in the radial direction relative to the spindle axis 24, and also using the known radius r of the circular path K, on the basis of the following three equations $$(xM)^2+(r+xM+A-m_1)^2-2xM(r+xM+A-m_1)\cos\alpha=r^2$$

$$(xM)^2+(r+xM+A-m_2)^2-2xM(r+xM+A-m_2)\sin\alpha=r^2$$

$$(xM)^2+(r+xM+A-m_3)^2-2xM(r+xM+A-m_3)\cos\alpha=r^2,$$

the variables of which are noted again in FIG. 6 in conjunction with the circular cylindrical surface 48 of the sleeve 46 of the scanned circular path K and the reference circular path RK and the radius r of the circular cylindrical surface 48, the variables xM, α and A can be ascertained, wherein for example the variable A in the approach described hereinafter is not directly relevant, and instead only the variables xM and α are used further.

Figure 7:
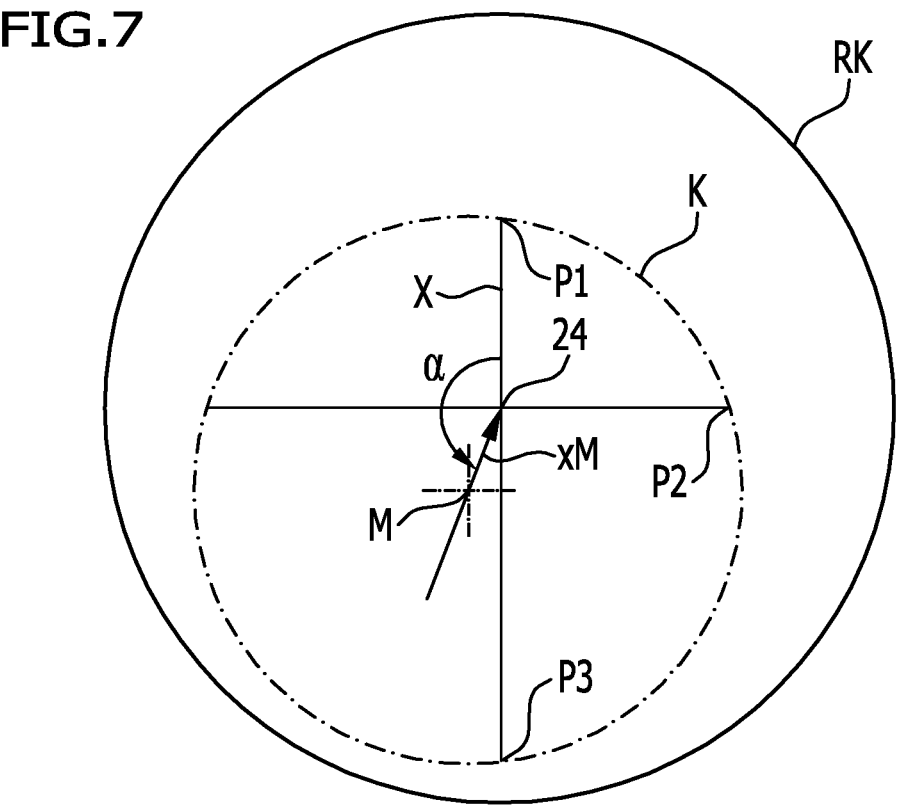
FIG. 7 shows a realistic illustration of the position of the centre point as is calculated from the positions calculated according to FIG. 5.

The three equations are solved for example by means of the computer unit 68 by a numerical method in which the position of the centre point M of the scanned circular path K in relation to the spindle axis 24 representing the geometric axis is calculated, wherein the position of the centre point M is indicated on the one hand by the spacing xM of the centre point M from the geometric axis 24 and on the other hand by the angle α between the measurement plane E1 or connecting line of the measurement points P1 and P3 and the connecting line between the geometric axis and the centre point M, as shown in FIG. 7.

On the basis of this information relating to the position of the centre point M of the circular path K scanned by the probe tip 66 at the circular cylindrical surface 48 relative to the geometric axis 24, the adjustment path dx by which a displacement of the centre point M in the X direction is necessary so that said centre point subsequently is coincident with the geometric axis 24 can now be calculated, for example by means of the computer unit 64 using simple geometric calculations of the relationships shown in FIG. 8.

Figure 8:
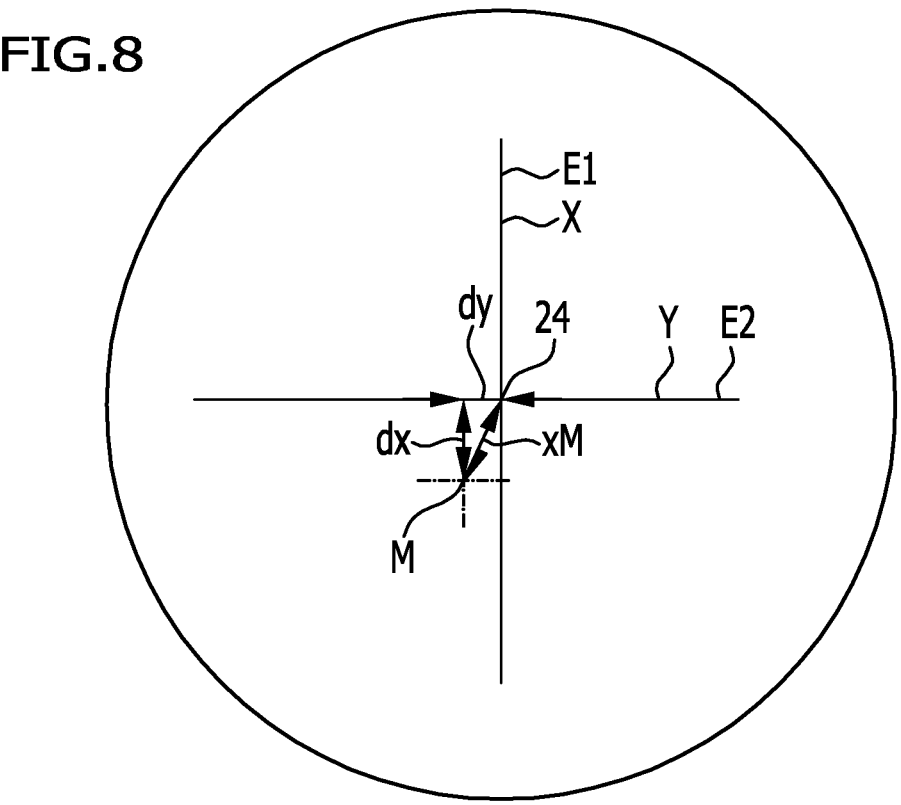
FIG. 8 shows an illustration of the geometric conditions with known position of the centre point relative to the geometric axis and relative to the measurement planes when ascertaining the positions of the measurement points and the adjustment paths dx and dy established therefrom by simple geometric consideration.

Furthermore, based on the premise that the Y direction runs perpendicularly to the X direction and intersects the geometric axis 24, it is also possible to calculate an adjustment path dy by which a displacement of the centre point M of the scanned circular path K at the circular cylindrical surface 48 must be performed in order for the centre point M to lie on the geometric axis 24 (FIG. 8).

For the relative movement of the machine tool units 14, 46 in accordance with the adjustment paths dx and dy, the measuring unit 64 is again pivoted about the spindle axis 24 and thus about the geometric axis until it is again in the measurement plane E1, which—as described above—was oriented such that it runs parallel to the X axis.

In this position of the measuring unit 64 the adjustment path dx by which the tool holder base 44 is to be moved in the X direction relative to the starting position can now be determined using the probe tip 66, wherein this movement of the tool holder base 44 in the X direction once the screws 58 are loosened continues until the value dx is reached.

The measuring unit 64 is then pivoted through 90°, such that the probe tip 66 lies in the measurement plane E2, which is pivoted through 90° about the geometric axis 24 relative to the measurement plane E1.

With this measuring unit 64 in the measurement plane E2, the displacement of the centre point by the adjustment path dy in the Y direction can then be monitored, this displacement being implemented by actuation of the adjustment devices 54 and 56 once the screws 58 have been loosened.

Figure 9:
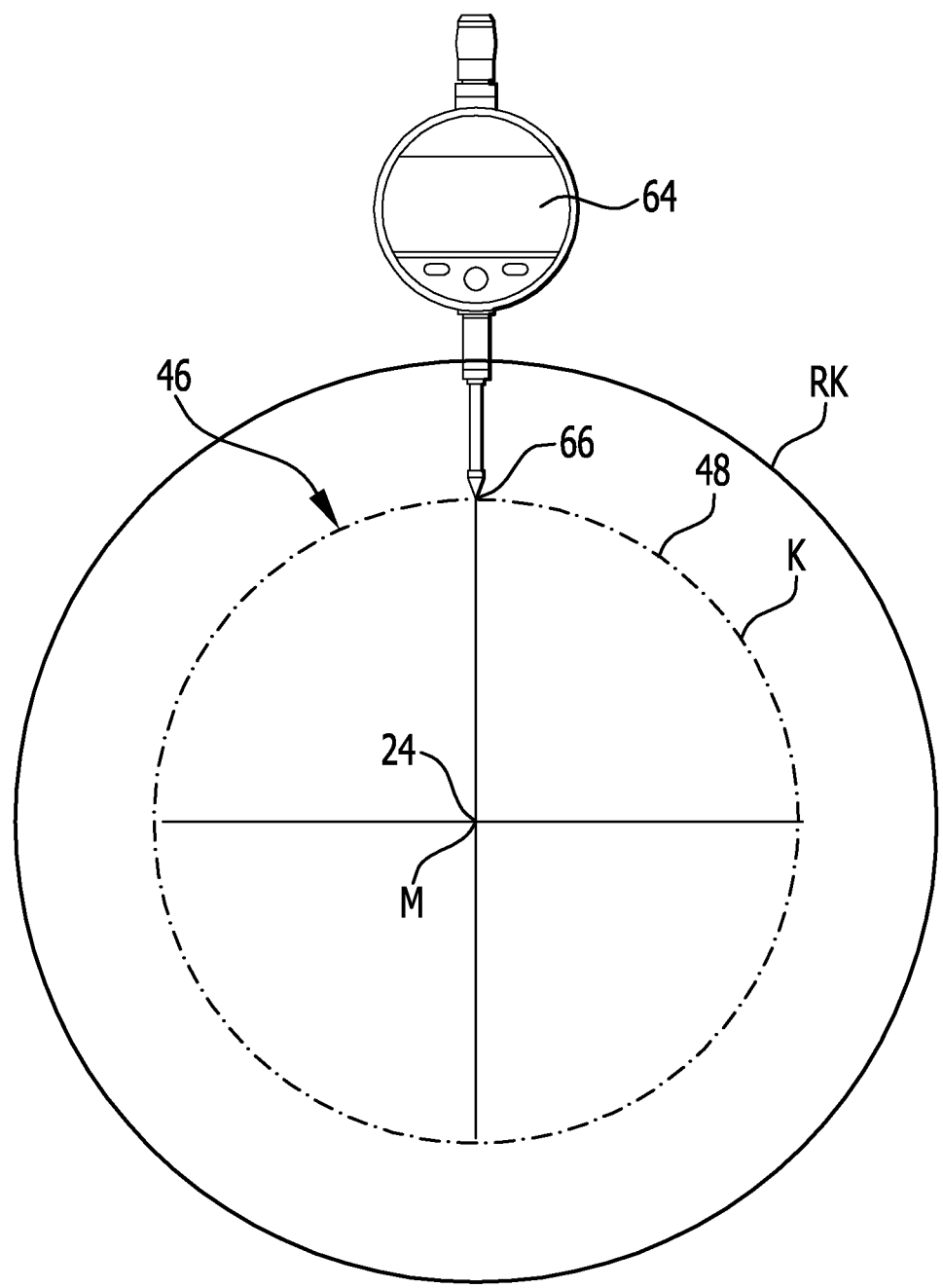
FIG. 9 shows an illustration of the centred position of the centre point on the geometric axis and the position of the circular path and of the reference circular path relative to one another in this case.

If the displacement of the centre point M of the sleeve 46 is performed correctly, the centre point M, as shown in FIG. 9, ultimately thus lies on the geometric axis 24, which can still be checked for example by the measuring unit 64, because in this case the probe tip 66 of the measuring unit 64 must measure the same value m in all rotational positions about the geometric axis 24 as spacing from the reference circular path RK.

Figure 10:
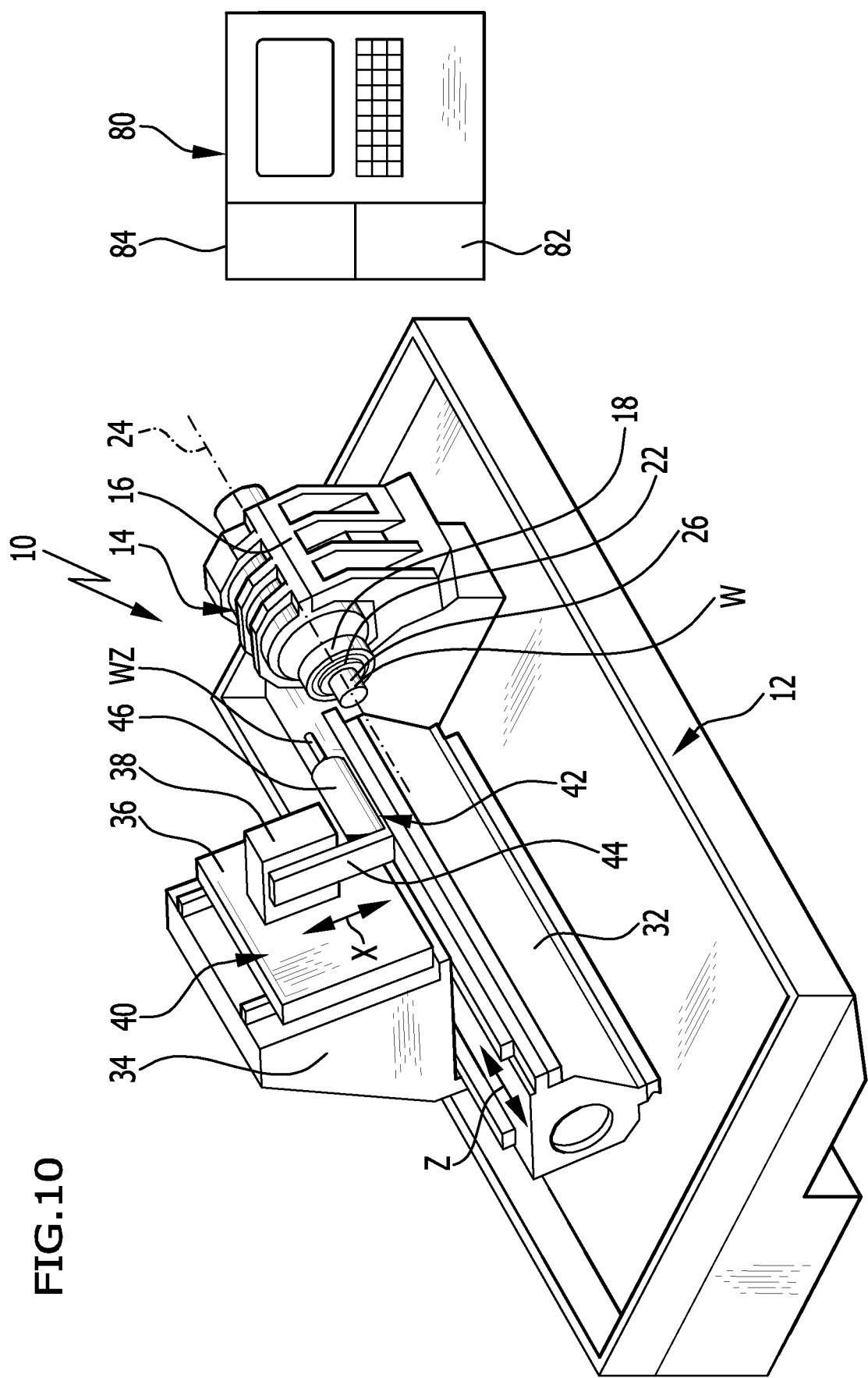
FIG. 10 shows a schematic illustration of a second exemplary embodiment of a lathe according to the invention with a machine controller and a centring controller.

In a second exemplary embodiment of the method according to the invention a controller 80 associated with the machine tool 10 is also used in addition thereto, which controller controls the tool spindle unit 14 in the usual way, wherein the motor spindle 18 is controlled both in respect of its rotational speed and as a C axis, that is to say is controlled in respect of its rotational position (FIG. 10).

Furthermore, the machine controller 80 controls the compound slide 40 for positioning the tool carrier 38 relative to the workpiece W, for example both in the Z direction and in the X direction.

The centring controller 82 is connected to the measuring unit 64 either wirelessly or in a wired manner, so as to read therefrom the measurement values m1, m2 and m3 to be ascertained and to transfer these to a computer unit 84, as will explained in detail further below, and on the other hand is coupled to the machine controller 80, so as to operate the workpiece spindle unit 14 as C axis by means of the machine controller 80 and thus pivot the measuring unit 64 about the spindle axis 24 representing the geometric axis, such that it is thus possible, controlled by the centring controller 82, to ascertain the spacings m1, m2 and m3 of the measurement points P1, P2 and P3 by the probe tip 66 of the measuring unit 64 from the reference circular path RK without manual intervention at said measurement points as was explained in detail in conjunction with the first exemplary embodiment.

In order to carry out the second exemplary embodiment of the method according to the invention, the methods steps explained hereinafter are performed by means of the centring controller 82.

Figure 11:
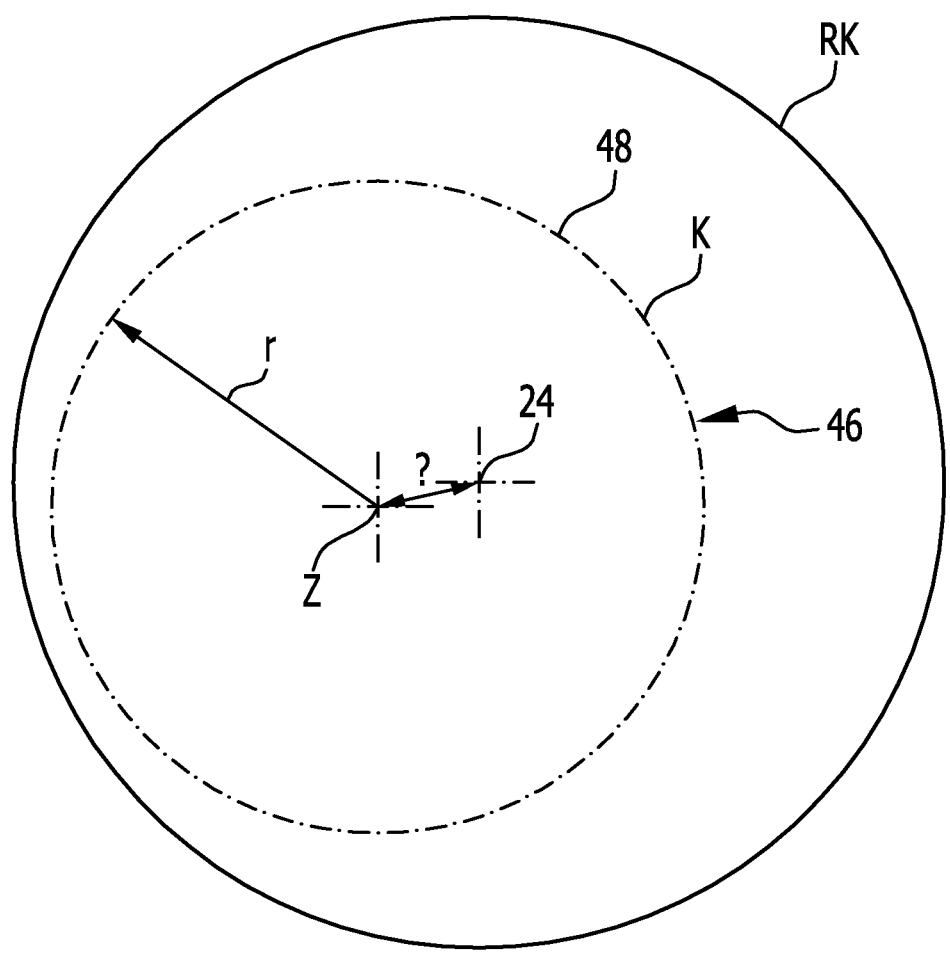
FIG. 11 shows a schematic illustration of the position of the scannable circular path and is given by the circular-cylindrical surface of the sleeve, with uncentred arrangement of the sleeve relative to the geometric axis similar to FIG. 3.

As is shown in FIG. 11, the spacing of the cylinder axis Z of the sleeve 46 from the spindle axis 24 representing the geometric axis is similarly unknown, as shown in FIG. 3, and so this spacing has to be established.

Figure 12:
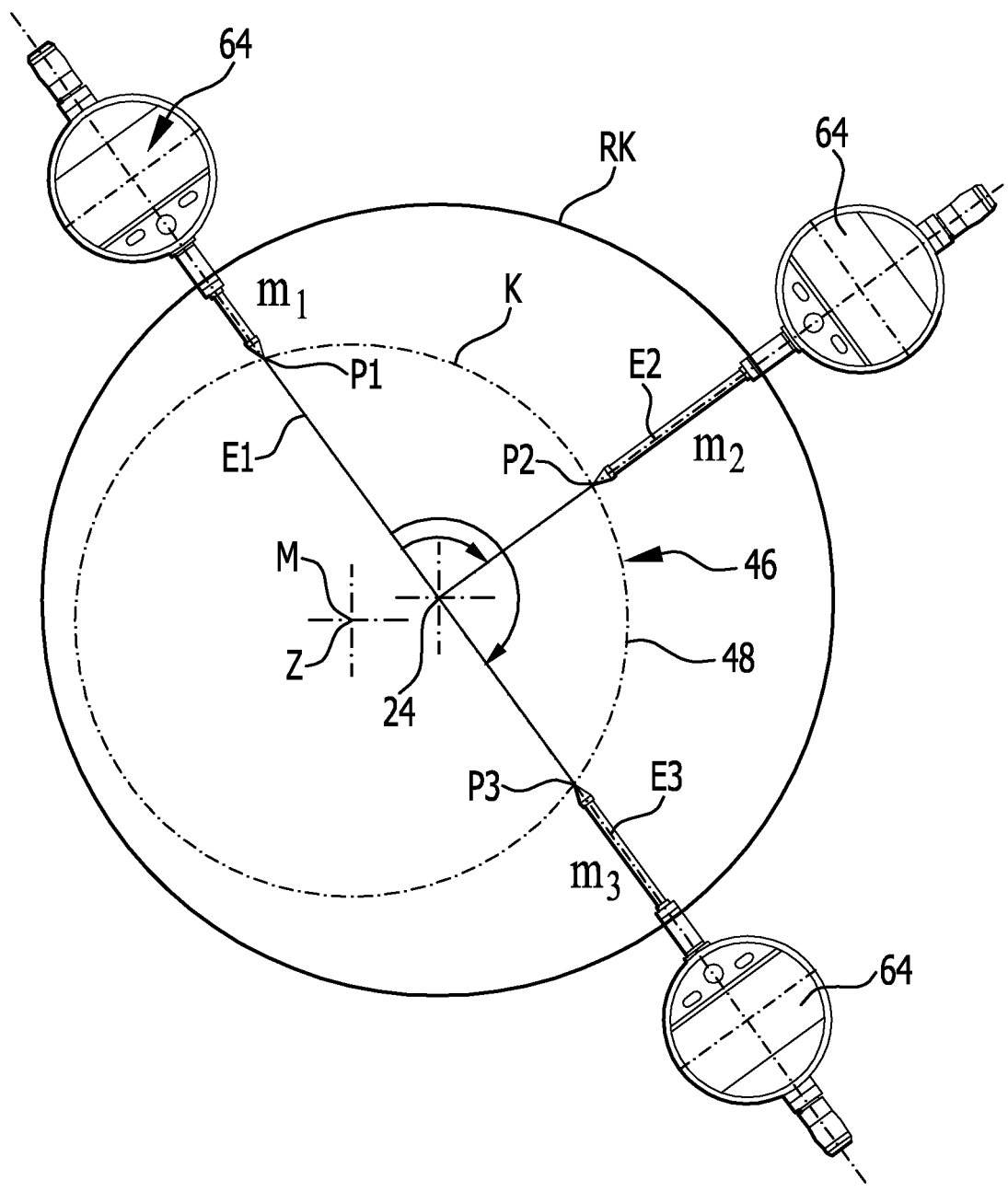
FIG. 12 shows an illustration of the ascertainment of the positions of the three measurement points in the three measurement planes similar to FIG. 5.

In this regard, similarly to in the first exemplary embodiment of the method according to the invention, the circular cylindrical surface 48 of the sleeve 46 along the circular path K is scanned by means of the measuring unit 64 held likewise by the holder 62 in the workpiece receptacle 26, for example the chuck, wherein in the second exemplary embodiment the pivoting of the measuring unit 64 about the spindle axis 24 representing the geometric axis is now controlled by the centring controller 82 by control of the workpiece spindle unit 14 as C axis by means of the machine controller 80 (FIG. 12).

In addition, in contrast to the first exemplary embodiment, as shown in FIG. 12, the position of the measurement plane E1 is not correlated with the X axis, and instead the position of the first measurement plane E1 is selected arbitrarily by the machine controller 80.

The selection of the position of the first measurement point P1 is thus also arbitrary.

In the first measurement plane E1 the spacing m1 of the measurement point P1 in the measurement direction MR1 starting from the reference circular path RK is ascertained by means of the measuring unit 64 in the same way as described in conjunction with the first exemplary embodiment, controlled now by the centring controller 82, and said spacing is transferred to the computer unit 84.

Then, effected by the workpiece spindle unit 14 operated as C axis and controlled by the centring controller 82 by means of the machine controller 80, the measuring unit 64 is pivoted starting from the measurement plane M1 into the measurement plane E2, which runs at an angle of 90° to the measurement plane E1, and at the measurement point P2 in the measurement direction MR2 the spacing P2 from the reference circular path RK in the radial direction relative to the spindle axis 24 representing the geometric axis is established, wherein the spacing m2 is ascertained and transferred to the computer unit 84.

Lastly, the measuring unit 64 is pivoted by the centring controller 82 into the measurement plane E3 for ascertaining the spacing m3 of the measurement point P3 from the reference circular path RK in the measurement direction MR3.

Figure 13:
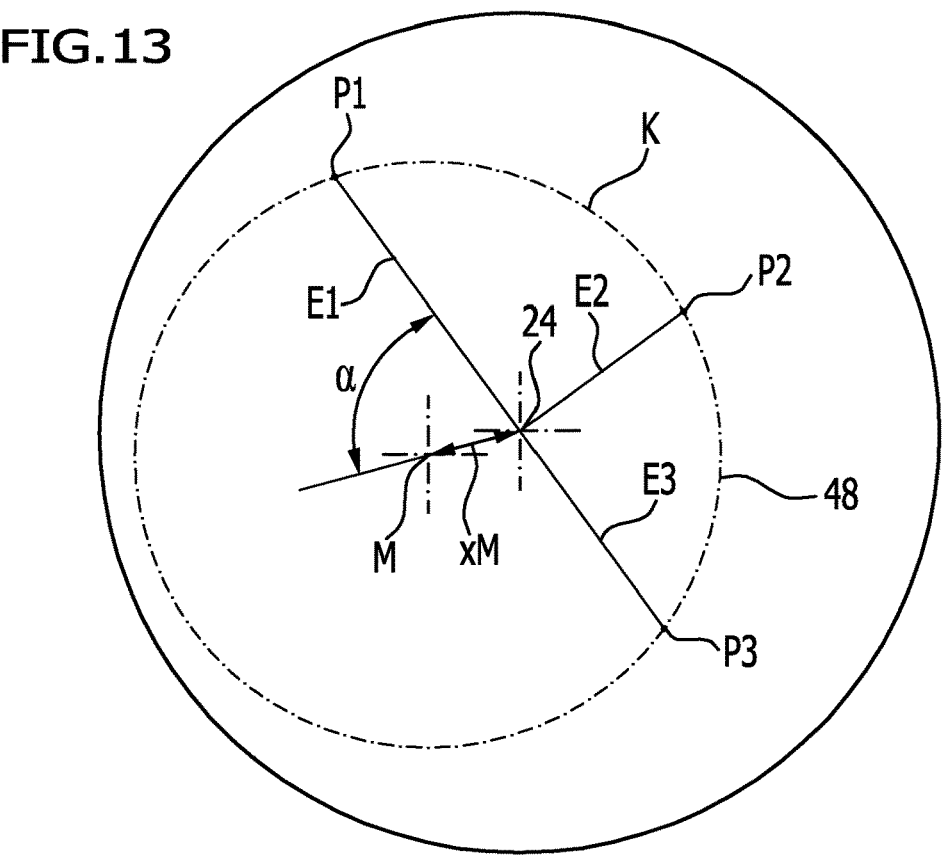
FIG. 13 shows an illustration of the parameters, resulting from the positions of the measurement points, for the position of the centre point in a first determination position.

With these values for the spacings m1, m2 and m3 and the formulas already cited in conjunction with the first exemplary embodiment, the position of the centre point M of the circular path K relative to the first measurement plane E1 can be ascertained by means of the computer unit 84 by establishing the spacing xM of the centre point M from the geometric axis 24 and the angle α between the measurement plane E1 and the connecting line between the centre point M and the geometric axis 24, as shown in FIG. 13.

Since, in the second exemplary embodiment of the method according to the invention, the position of the X axis relative to the measurement planes E1, E2 and E3 is not known, it is necessary to ascertain the X axis predefined by the machine tool, in particular the compound slide 40.

Figure 14:
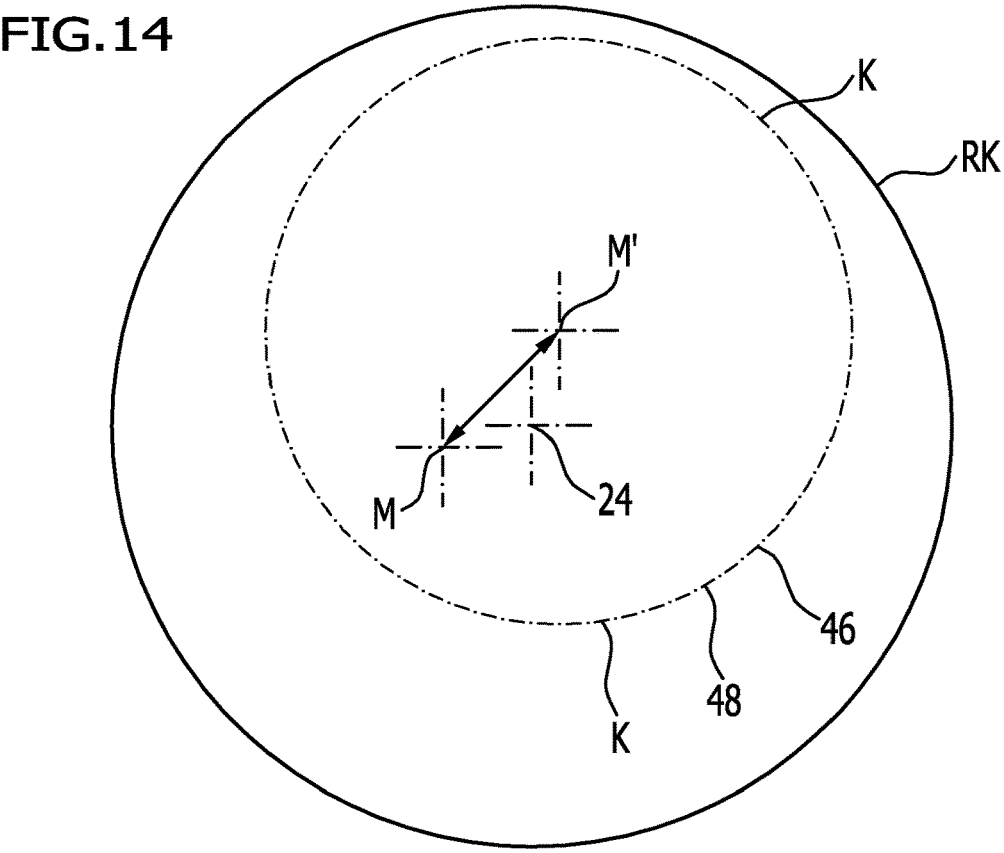
FIG. 14 shows the position of the circular path following displacement thereof from the first determination position, illustrated in FIGS. 11 to 13, into a second determination position.

For this reason, the compound slide 40 is controlled by means of the machine controller 80 such that it is moved, starting from the tool holder 42, from the first determination position, in which the centre point M of the circular path K has already been ascertained, for example in the direction of the X axis into a second determination position, as is shown in FIG. 14.

In FIG. 14 the centre point M ascertained in the first determination position is shown, and also the centre point M' in the second determination position, the position of which however has not yet been ascertained.

Figure 15:
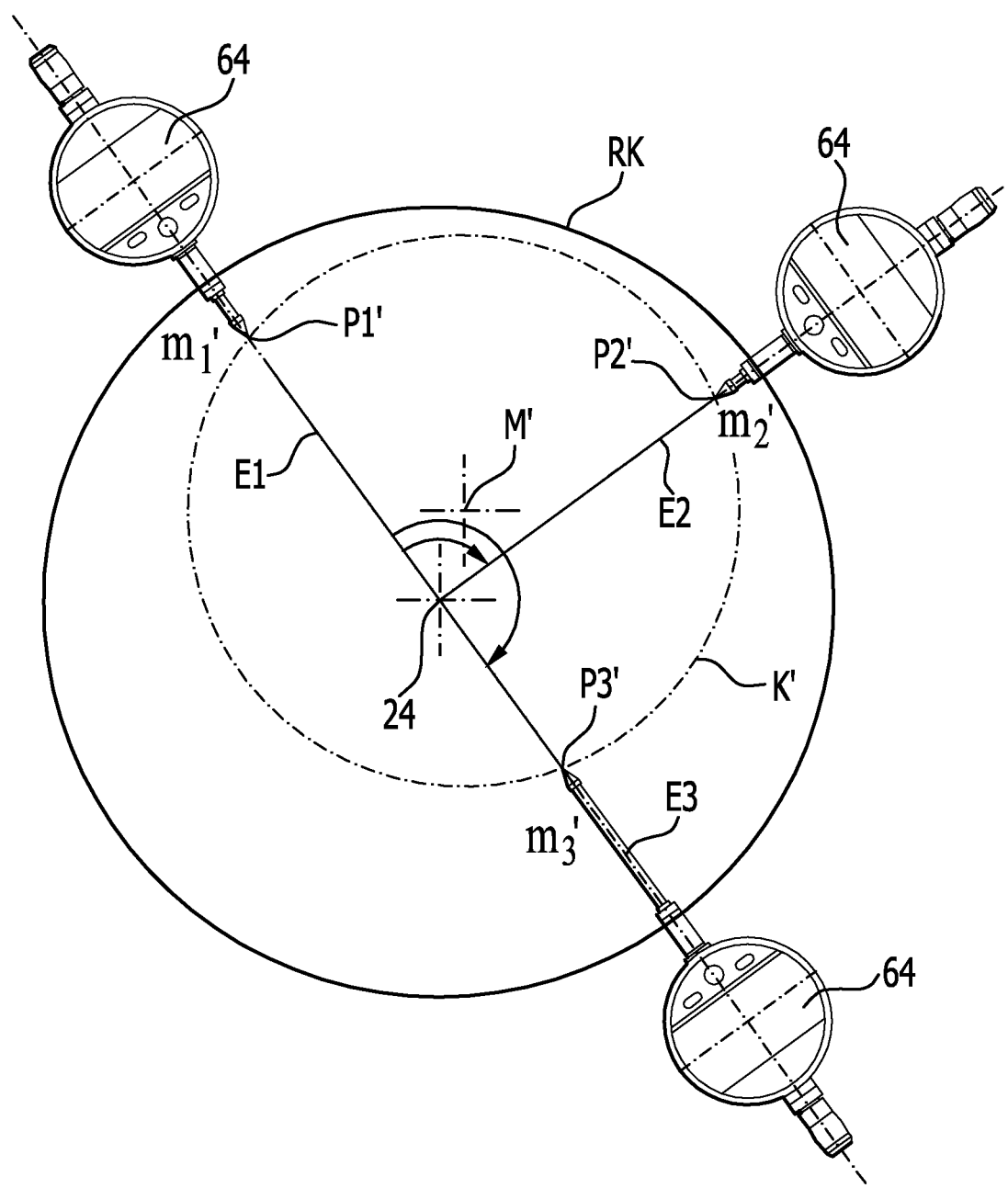
FIG. 15 shows an illustration of the ascertainment of the positions of the measurement points in the measurement planes corresponding to FIG. 12 with a circular path in the second determination position.

In this second determination position of the sleeve 46 and thus the circular path K' over the circular cylindrical surface 48, the position of the circular path K' relative to the reference circular path RK is likewise determined, as shown in FIG. 15, by ascertaining the position of three measurement points P1', P2' and P3', determined in the determination planes E1, E2 and E3 respectively, which for example are identical to those in the first determination position (FIG. 15).

Here, for each of the measurement points P1', P2', P3' in the measurement directions MR1, MR2, MR3, the spacing m1', m2' and m3' of the first measurement point P1', of the second measurement point P2' and of the third measurement point P3' from the reference circular path RK in the radial direction relative to the geometric axis 24 is established, controlled by the centring controller 82 in the same way as described beforehand by pivoting the measuring unit 64 by means of the workpiece spindle unit 14 operated as C axis (FIG. 15).

Figure 16:
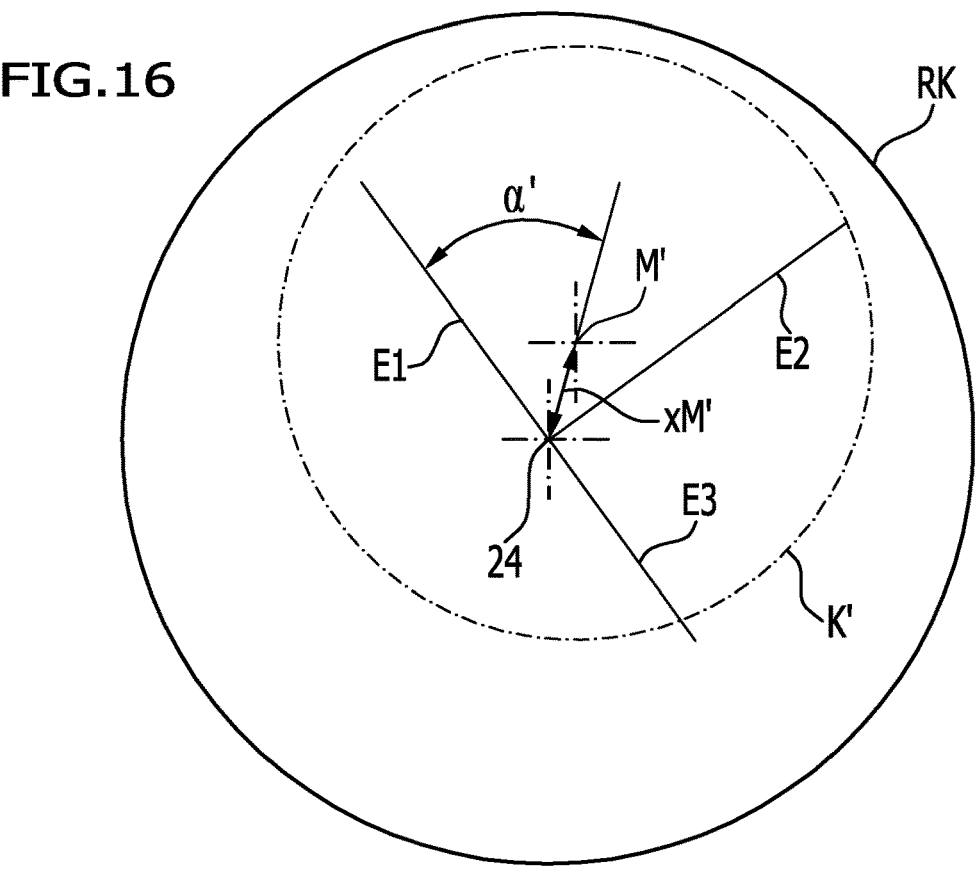
FIG. 16 shows an illustration of the parameters, resulting from the measurement positions, for the position of the centre point in the second determination position.

With these values for the spacings m1', m2' and m3, the position of the centre point M' of the circular path K' can be established in turn by means of the computer unit 84 by defining the spacing of the centre point M' from the geometric axis 24, given by the value xM', and by defining the angle α' between the connecting line between the geometric axis 24 and the centre point M' and the measurement plane E1 by the centring controller 82, as shown in FIG. 16.

Figure 17:
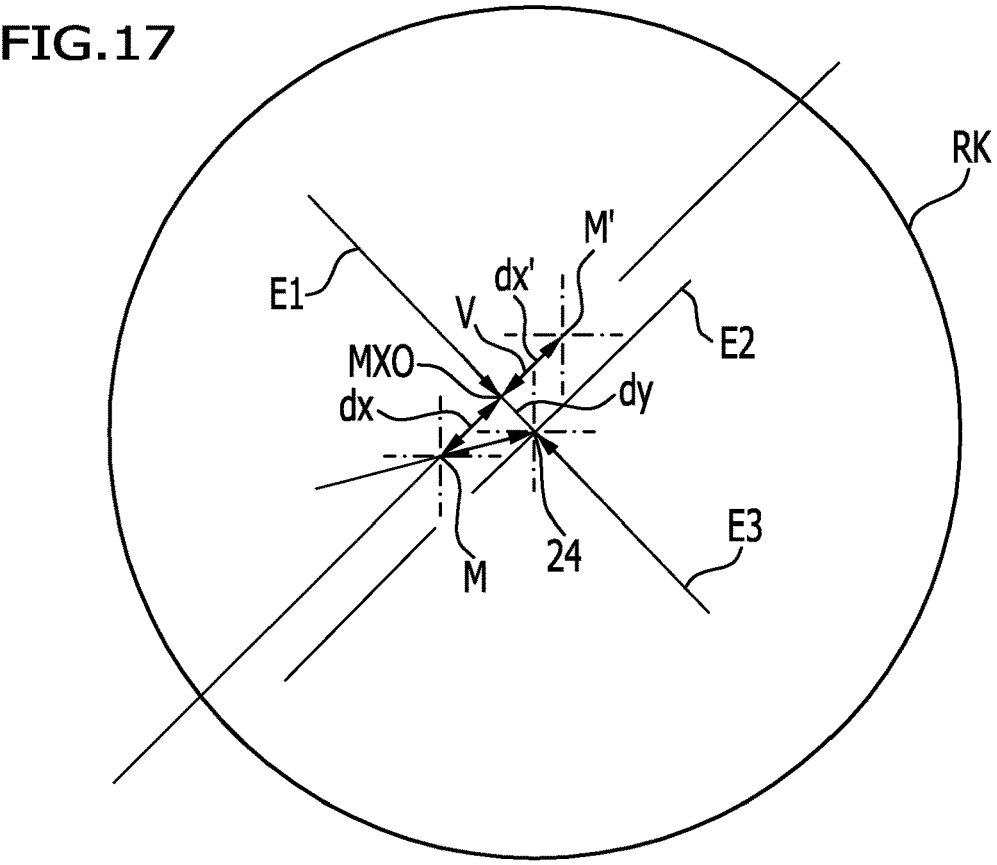
FIG. 17 shows a schematic illustration of an establishment of a connecting line V running through the two centre points in the two determination positions and the resultant calculation of the adjustment paths by simple geometric relationships between the positions of the centre points in the two adjustment positions and the course of the connecting line V.
Figure 18:
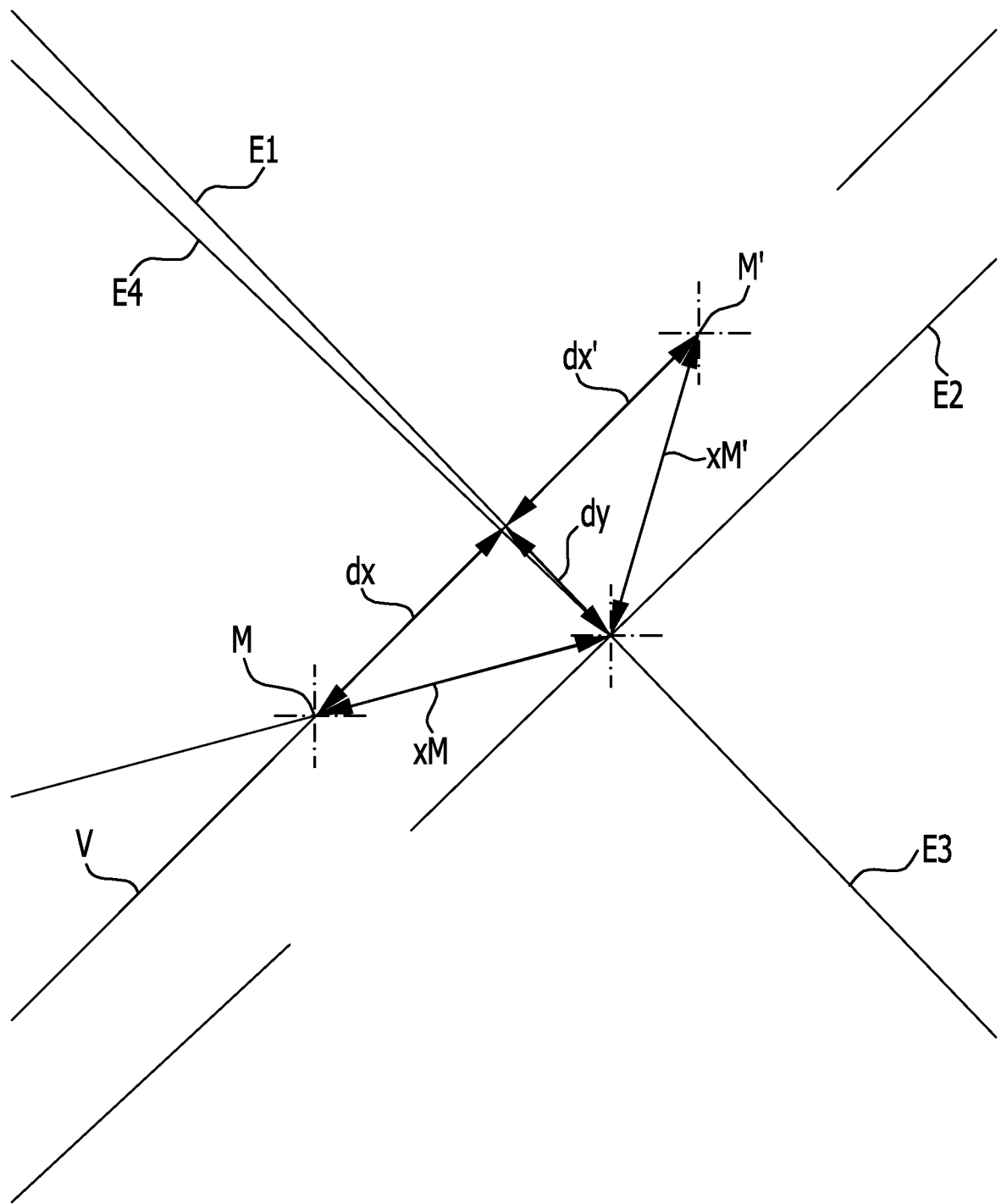
FIG. 18 shows a further enlarged illustration of the conditions and of the orientation of a measurement plane for establishing and for determining an adjustment path in a Y direction.
Figure 19:
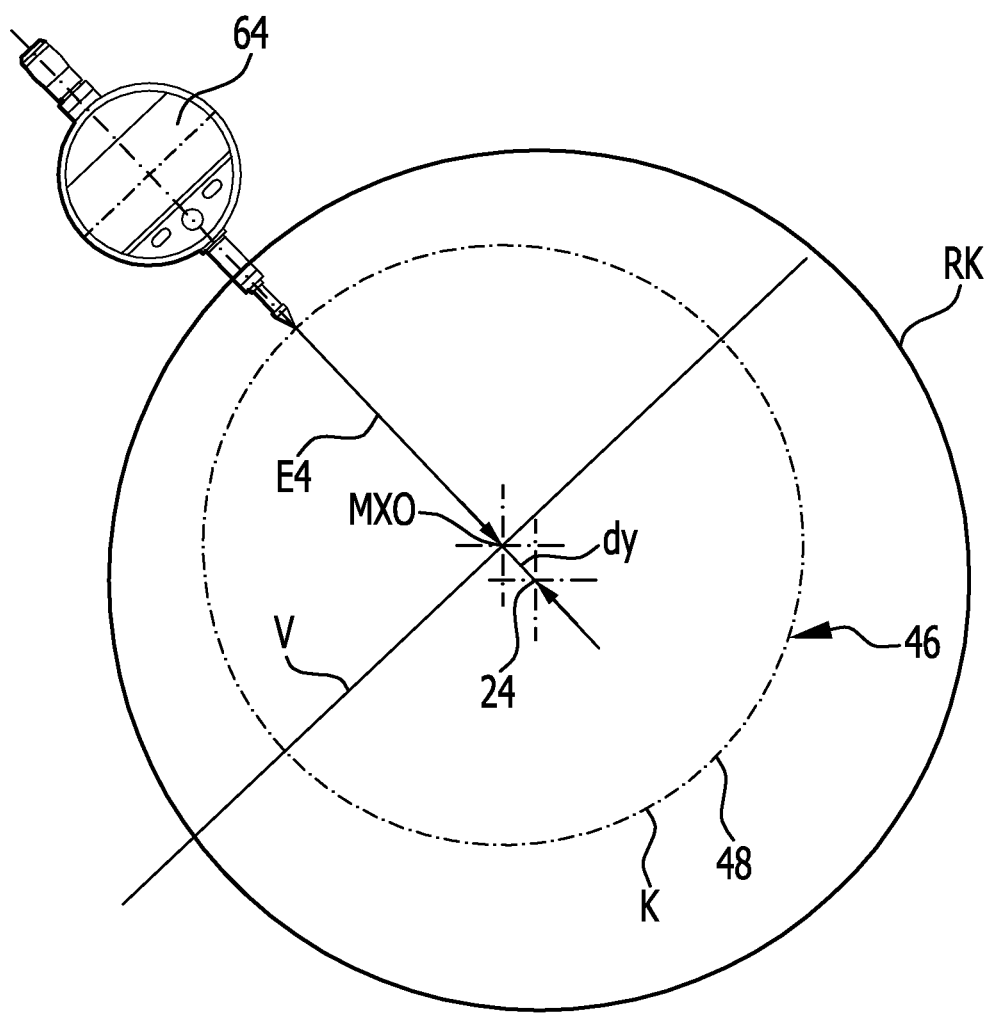
FIG. 19 shows an illustration of the orientation of the measuring unit in the measurement plane for establishing the displacement of the centre point of the circular path in the Y direction.

As is shown in FIGS. 17 and 18 on an enlarged scale, the computer unit 84 thus knows both the position of the measurement point M and the position of the measurement point M' relative to the measurement planes E1, E2 and E3.

Here, a connecting line V predefined by the movement in the X direction runs between the centre points M and M' in any orientation relative to the measurement planes E1, E2 and E3, since the position thereof was selected uncorrelated relative to the X axis.

By ascertaining the position and orientation of the connecting line V however, the computer unit 84 has the possibility of ascertaining the orientation and position of the X axis relative to the geometric axis 24 and thus also ascertaining the adjustment path dx by which the centre point M must be moved starting from the first determination position, or the adjustment path dx' by which, the centre point M' must be moved starting from the centre point M' so as to position the centre points M and M' by movement in the X direction at a point MX0, starting from which merely a displacement in the Y direction by the adjustment path dy is necessary to achieve a centring of the sleeve 46 relative to the geometric axis 24.

Since the compound slide 40 is constructed such that no controlled movement in the Y direction is possible therewith by means of the machine controller 80, the measuring unit 64 is pivoted about the spindle axis 24 by the centring controller 82 by means of the machine controller 80, such that said measuring unit is in a measurement plane E4 running perpendicularly to the connecting line V defining the X direction and thus parallel to the Y direction and intersects the geometric axis 24.

In this position of the measuring unit 64 in the measurement plane E4, the centring controller 82 is able to measure the displacement of the sleeve 46 in the Y direction that is possible manually in the same way as in the first exemplary embodiment by manual adjustment of the adjustment units 54, 56 associated with the tool holder base 44.

Here, the centring controller 82 can then indicate the adjustment path dy as a spacing of the centre point MX0 from the geometric axis 24, such that the manual adjustment is possible under consideration of the adjustment path dy, until the centre point MX0 is coincident with the geometric axis 24.

Alternatively, however, it is also conceivable that the slide system 40 has a Y axis such that the centring controller 82 can control the Y axis by means of the machine controller 80 until the centre point MX0 is coincident with the geometric axis 24, wherein this can be implemented either by internal determination of the position in the Y direction by the machine controller or additionally with the aid of the measuring unit 64 and monitoring of the displacement in the Y direction by means of the measuring unit 64.

Thus, the sleeve 46 likewise can be positioned relative to the spindle axis 24 with the aid of the centring controller 82.

The invention claimed is:

1. A method for positioning a centre point of a second machine tool unit of a machine tool on a geometric axis of a first machine tool unit of the machine tool, wherein the second machine tool unit has a circular path that is concentric with the centre point, is scannable and lies on a circular cylindrical surface, and wherein the first machine tool unit has a component that is rotatable about an axis of rotation coincident with the geometric axis, comprising arranging a measuring unit on the first machine tool unit in a defined manner relative to the geometric axis and establishing by means of the measuring unit the position of the circular path in a geometric plane, defined by the circular path, relative to the geometric axis, ascertaining the position of the circular path ascertained by means of the measuring unit by establishing the positions of three measurement points arranged at defined angular spacings from one another over the circular path relative to the geometric axis, calculating the position of the centre point of the circular path in the geometric plane relative to the geometric axis and a reference direction running through the geometric axis on the basis of the positions of the measurement points and the known radius of the circular path, and calculating adjustment paths in the geometric plane, which are associated with the adjustment directions, for positioning the centre point on the geometric axis by using machine tool-based adjustment directions of the machine tool units relative to one another, and moving the machine tool units relative to one another in accordance with these adjustment paths.

2. A method according to claim 1, wherein the positions of the three measurement points are defined by pivoting the measuring unit about the geometric axis in a measurement direction corresponding to the particular measurement point and running radially relative to the geometric axis, and the position of the particular measurement point in the corresponding measurement direction is established by means of the measuring unit.

3. A method according to claim 2, wherein the position of the particular measurement point is ascertained by measuring a spacing thereof from a reference circular path running around the geometric axis in a radial direction relative to the geometric axis.

4. A method according to claim 1, wherein the three measurement points are selected such that they lie within an angular range of 180° about the geometric axis.

5. A method according to claim 1, wherein the three measurement points are selected such that an angular range of 90° lies between a first measurement point and a second measurement point and between the second measurement point and a third measurement point.

6. A method according to claim 1, wherein the machine tool-based adjustment directions are determined by arranging the position of one of the three measurement points in a geometric measurement direction running radially relative to the geometric axis and parallel to one of the adjustment directions.

7. A method according to claim 6, wherein a first of the three measurement points is arranged in the geometric measurement direction running through the geometric axis and parallel to one of the adjustment directions.

8. A method according to claim 1, wherein one of the machine tool-based adjustment directions is determined by a first establishment of the position of the centre point of the second machine tool unit in a first determination position, a subsequent relative movement of the two machine tool units along a selected one of the adjustment directions into a second determination position, and in this position a second establishment of the position of the centre point of the second machine tool unit, and in that the position and course of the selected adjustment direction are ascertained by establishing the orientation of a connecting line between the centre points in the first and second determination position.

9. A method according to claim 8, wherein the measurement directions in which the positions of the measurement points are established are identical in the first determination position and in the second determination position.

10. A method according to claim 1, wherein, as the machine tool units are moved in at least one of the adjustment directions, the at least one continuous adjustment path is determined by means of the measuring unit.

11. A method according to claim 10, wherein, in order to determine the movement of the machine tool units relative to one another in the adjustment directions, the measuring unit is positioned, by pivoting about the geometric axis, in a measurement direction running parallel to the particular adjustment direction.

12. A method according to claim 1, wherein positions of the measurement points established by the measuring unit are transmitted to a computer unit, which establishes the centre point of the circular path relative to the geometric axis and a reference direction running through the geometric axis.

13. A method according to claim 12, wherein the computer unit, using information regarding the machine tool-based adjustment directions, establishes adjustment paths in the adjustment directions for positioning the centre point on the geometric axis.

14. A method according to claim 1, wherein the measuring unit is connected to the component rotatable about the axis of rotation, and in that, by means of a centring controller, the measuring unit is pivoted about the geometric axis by means of the first machine tool unit by control thereof in order to determine the three measurement points.

15. A method according to claim 12, wherein in each measurement point the position of the measurement point is established by means of the measuring unit by actuation and reading thereof by means of the centring controller and in particular is stored in the computer unit.

16. A method according to claim 14, wherein, in order to determine at least one of the adjustment paths, as the machine tool units move relative to one another in the at least one adjustment direction the measuring unit is pivoted in a measurement direction parallel to the adjustment direction by means of the centring controller by control of the first machine tool unit.

17. The method according to claim 12, wherein by means of the centring controller the machine tool units are moved relative to one another, by control of at least one movement unit of the machine tool units, in one of the adjustment directions from a first determination position into a second determination position, and in that in the second determination position the position of the circular path is ascertained in the same way as in the first determination position, and the position of the centre point of the circular path is calculated by means of the computer unit.

18. A method according to claim 17, wherein the adjustment direction is calculated by means of the computer unit establishing the orientation of a connecting line traversing the centre point in the first determination position and traversing the centre point in the second determination position.

19. A method according to claim 16, wherein the machine tool units, starting from the first or second determination position, are moved in the calculated adjustment direction over an adjustment path to such an extent that once the adjustment path in the further adjustment direction has been travelled over, the centre point lies on the geometric axis.

20. A method according to claim 16, wherein the adjustment path is ascertained in the further adjustment direction by the computer unit on the proviso that the further adjustment direction runs perpendicularly to the adjustment direction first calculated.

21. A method according to claim 20, wherein a measurement direction of the measuring unit is oriented parallel to the second adjustment direction by control of the rotation of the component of the first machine tool unit by the centring controller, and the adjustment path that is to be travelled over in this adjustment direction is measured.

22. A machine tool comprising a first machine tool unit with a component that is rotatable about an axis of rotation coincident with a geometric axis and comprising a second machine tool unit with a circular path that is concentric with the centre point and lies on a circular cylindrical surface, the machine tool is associated with a measuring unit which determines positions of measurement points lying on the circular path relative to the geometric axis.

23. A machine tool according to claim 22, wherein the machine tool is associated with a computer unit, and in that the computer unit determines and stores measurement values of the measuring unit.

24. A machine tool according to claim 23, wherein the computer unit establishes the position of the centre point relative to the geometric axis and relative to a reference direction on the basis of the positions of measurement points lying at defined angular spacings on the circular path and on the basis of the known radius of the circular path.

25. A machine tool according to of claim 22, wherein the computer unit, using information regarding the machine tool-based adjustment directions, establishes adjustment paths for positioning the centre point on the geometric axis.

26. A machine tool according to claim 20, wherein the machine tool comprises a machine controller, which is associated with the computer unit.

27. A machine tool according to claim 22, wherein the measuring unit is connected to the component that is rotatable about the axis of rotation, and in that by means of a centring controller the measuring unit for determining the three measurement points is pivoted about the geometric axis by means of the first machine tool unit by control thereof.

28. A machine tool according to claim 27, wherein for each measurement point the position of the measurement point is established by means of the measuring unit by actuation and reading thereof by means of the centring controller and in particular is stored in the computer unit.

29. A machine tool according to claim 27, wherein the centring controller, for determining at least one of the adjustment paths, as the machine tool units move relative to one another in the at least one adjustment direction pivots the measuring unit, by control of the first machine tool unit, in a measurement direction parallel to the adjustment direction.

30. Machine tool according to claim 22, wherein the centring controller, after establishing the position of the centre point of the circular path in a first determination position, moves the machine tool units relative to one another, by control of at least one movement unit of the machine tool units, in one of the adjustment directions from the first determination position into a second determination position, and in that the computer unit in the second determination position ascertains the position of the circular path in the same way as in the first determination position, and the position of the centre point of the circular path is calculated by means of the computer unit.

31. A machine tool according to claim 30, wherein the computer unit calculates the adjustment direction by means of the computer unit establishing the orientation of a connecting line traversing the centre point in the first determination position and traversing the centre point in the second determination position.

32. A machine tool according to claim 30, wherein the centring controller moves the machine tool units, starting from the first or second determination position, in the calculated adjustment direction over an adjustment path to such an extent that once a further adjustment path has been travelled over in the further adjustment direction, the centre point lies on the geometric axis.

33. A machine tool that operates a method according to any claim 1, the machine tool comprising a first machine tool unit with a component that is rotatable about an axis of rotation coincident with a geometric axis and comprising a second machine tool unit with a circular path that is concentric with the centre point and lies on a circular cylindrical surface, the machine tool is associated with a measuring unit which determines positions of measurement points lying on the circular path relative to the geometric axis.

* * * * *

UNITED STATES PATENT AND TRADEMARK OFFICE
CERTIFICATE OF CORRECTION

PATENT NO. : 10,788,306 B2  
APPLICATION NO. : 16/129103  
DATED : September 29, 2020  
INVENTOR(S) : Stefan Grossmann et al.

Page 1 of 1

It is certified that error appears in the above-identified patent and that said Letters Patent is hereby corrected as shown below:

On the Title Page

Item [73], delete "Index-Werke GmbH and Co. KG Hahn and Tessky" and insert -- Index-Werke GmbH & Co. KG Hahn & Tessky --.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*